United States Patent
Zou

(10) Patent No.: US 10,812,477 B2
(45) Date of Patent: Oct. 20, 2020

(54) BLOCKCHAIN-BASED ENTERPRISE AUTHENTICATION METHOD, APPARATUS, AND DEVICE, AND BLOCKCHAIN-BASED AUTHENTICATION TRACEABILITY METHOD, APPARATUS, AND DEVICE

(71) Applicant: ALIBABA GROUP HOLDING LIMITED, Grand Cayman (KY)

(72) Inventor: Xueqing Zou, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/834,999

(22) Filed: Mar. 30, 2020

(65) Prior Publication Data

US 2020/0244649 A1    Jul. 30, 2020

Related U.S. Application Data

(63) Continuation of application No. PCT/CN2020/071093, filed on Jan. 9, 2020.

(30) Foreign Application Priority Data

Jun. 18, 2019  (CN) .......................... 2019 1 0525284

(51) Int. Cl.
*H04L 29/06* (2006.01)
*G06Q 50/18* (2012.01)
*H04L 9/06* (2006.01)

(52) U.S. Cl.
CPC ......... *H04L 63/0853* (2013.01); *G06Q 50/18* (2013.01); *H04L 9/0637* (2013.01)

(58) Field of Classification Search
CPC .... H04L 63/0853; H04L 9/0637; G06Q 50/18
See application file for complete search history.

(56) References Cited

U.S. PATENT DOCUMENTS 7,017,051 B2    3/2006   Patrick
7,725,717 B2    5/2010   Roux et al.
(Continued)

*Primary Examiner* — John B King

(57) ABSTRACT

One or more embodiments of the present specification provide a blockchain-based enterprise authentication method, apparatus, and device. The authentication method includes: receiving an enterprise authentication request, wherein the enterprise authentication request comprises to-be-authenticated enterprise information of an enterprise, to-be-authenticated identity information of a legal representative of the enterprise, and auxiliary authentication information; performing a first determination of whether the to-be-authenticated enterprise information matches with enterprise information stored in a first database; performing a second determination of whether the to-be-authenticated identity information matches with legal representative identity information stored in a second database; sending an obtaining request to a client device for auxiliary legal representative information according to the auxiliary authentication information; performing a third determination of whether the to-be-authenticated identity information is authenticated based on the auxiliary legal representative information; generating an enterprise authentication record if the first determination, the second determination, and the third determination are affirmative.

17 Claims, 7 Drawing Sheets

(56) References Cited

U.S. PATENT DOCUMENTS

| | | |
|---|---|---|
| 9,413,533 B1 | 8/2016 | Lindemann |
| 9,635,000 B1 | 4/2017 | Muftic |
| 9,654,468 B2 | 5/2017 | Buer |
| 10,135,820 B2 | 11/2018 | Wagner |
| 2012/0239924 A1 | 9/2012 | Fedronic et al. |
| 2015/0379510 A1* | 12/2015 | Smith .................... H04L 9/3242 705/71 |
| 2016/0005032 A1 | 1/2016 | Yau et al. |
| 2016/0335533 A1* | 11/2016 | Davis ........................ G06F 9/44 |
| 2017/0085562 A1 | 3/2017 | Schultz et al. |
| 2017/0103472 A1* | 4/2017 | Shah .................. G06K 9/00597 |
| 2017/0149560 A1 | 5/2017 | Shah |
| 2017/0206604 A1* | 7/2017 | Al-Masoud ........... G06F 16/951 |
| 2017/0302460 A1 | 10/2017 | Song et al. |
| 2018/0032759 A1* | 2/2018 | Radocchia ............. G06Q 50/28 |
| 2018/0048461 A1 | 2/2018 | Jutla et al. |
| 2018/0152297 A1 | 5/2018 | Fielding et al. |
| 2018/0173871 A1 | 6/2018 | Toth |
| 2018/0197159 A1* | 7/2018 | Sheerin ............... G06Q 20/3829 |
| 2018/0232828 A1* | 8/2018 | Joao .................... G06Q 50/184 |
| 2018/0253539 A1 | 9/2018 | Minter et al. |
| 2018/0308566 A1* | 10/2018 | Dempers ................. G06F 21/35 |
| 2019/0075108 A1* | 3/2019 | Clarke .................. H04L 9/0637 |
| 2019/0188411 A1* | 6/2019 | Kroutik ................ H04L 9/0894 |
| 2019/0266597 A1* | 8/2019 | Mohtar ................ G06Q 20/065 |
| 2019/0318122 A1* | 10/2019 | Hockey .................. G06Q 20/02 |
| 2020/0035339 A1* | 1/2020 | Eevani .................. H04L 9/0894 |
| 2020/0104958 A1* | 4/2020 | Cheng-Shorland ......................... G06F 3/0484 |
| 2020/0127843 A1* | 4/2020 | Webster ................ H04L 9/3247 |

* cited by examiner

US 10,812,477 B2

BLOCKCHAIN-BASED ENTERPRISE AUTHENTICATION METHOD, APPARATUS, AND DEVICE, AND BLOCKCHAIN-BASED AUTHENTICATION TRACEABILITY METHOD, APPARATUS, AND DEVICE

CROSS REFERENCE TO RELATED APPLICATIONS

This application is a continuation application of International Patent Application No. PCT/CN2020/071093, filed on Jan. 9, 2020, which claims priority to Chinese Patent Application No. 201910525284.9, filed on Jun. 18, 2019. The entire content of the above referenced applications are incorporated herein by reference.

TECHNICAL FIELD

The present application relates to the field of identity authentication technologies, and in particular, to a blockchain-based enterprise authentication method, apparatus, and device, and a blockchain-based authentication traceability method, apparatus, and device.

BACKGROUND

With the development of Internet technologies, increasingly more enterprises provide Internet-based products or services, and a key prerequisite for enterprises to provide Internet-based products or services is to perform identity authentication for an enterprise. Usually, when the identity of an enterprise needs to be authenticated, the enterprise needs to upload materials such as industry and commerce, taxation, and business qualifications to an authentication platform, and the authentication platform requires a large amount of manpower and time to review the materials uploaded by the enterprise. Consequently, the authentication process is opaque, the authentication result is uncontrollable, the authentication efficiency is low, the authentication cost is high, and the authentication data has the risk of loss and tampering.

SUMMARY

The purpose of one or more embodiments of the present specification is to provide a blockchain-based enterprise authentication method, apparatus, and device, and a blockchain-based authentication traceability method, apparatus, and device, and a blockchain-based trusted execution environment. An authentication process of the enterprise is transparent and visible to multiple parties, so that credibility and notarization of the enterprise authentication process is achieved, and authentication results are brought on chain to ensure tamper resistance and judicial validity of the authentication results as well as traceability of the enterprise authentication process. Furthermore, the authentication process does not require a lot of manpower and time, which improves authentication efficiency and reduces authentication costs.

To resolve the foregoing technical problems, one or more embodiments of the present specification are implemented as follows.

One or more embodiments of the present specification provide a blockchain-based enterprise authentication method, including: receiving an enterprise authentication request, wherein the enterprise authentication request comprises to-be-authenticated enterprise information of an enterprise, to-be-authenticated identity information of a legal representative of the enterprise, and auxiliary authentication information; performing, through a first smart contract deployed in a blockchain, a first determination of whether the to-be-authenticated enterprise information matches with enterprise information stored in a first database; performing, through a second smart contract deployed in the blockchain, a second determination of whether the to-be-authenticated identity information matches with legal representative identity information stored in a second database; sending an obtaining request to a client device for auxiliary legal representative information according to the auxiliary authentication information; performing, through the second smart contract deployed in the blockchain, a third determination of whether the to-be-authenticated identity information is authenticated based on the auxiliary legal representative information; generating an enterprise authentication record if the first determination, the second determination, and the third determination are affirmative; and writing the enterprise authentication record into the blockchain.

In some embodiments, the enterprise authentication record comprises at least one of the following: timestamp information of the first determination and; timestamp information of the second determination.

In some embodiments, the sending an obtaining request to a client device for auxiliary legal representative information comprises: determining contact information of the legal representative according to the auxiliary authentication information; and sending an obtaining request comprising a first hyperlink address based on the contact information, wherein a trigger operation on the first hyperlink address opens an authorization application or a webpage by which a legal representative image is collected; and the performing a third determination of whether the to-be-authenticated identity information is authenticated based on the auxiliary legal representative information comprises: determining whether the collected legal representative image matches with a legal representative image stored in the second database; and if so, determining that the to-be-authenticated identity information is authenticated based on the auxiliary authentication information.

In some embodiments, the sending an obtaining request to a client device for auxiliary legal representative information comprises: determining contact information of the representative according to the auxiliary authentication information; and sending an obtaining request comprising a second hyperlink address based on the contact information, wherein a trigger operation on the second link address opens an authorization application or a webpage by which an account operation is obtained; and the determining a third determination of whether the to-be-authenticated identity information is authenticated based on the auxiliary legal representative information comprises: determining whether an obtained account operation meets a preset condition; and if so, determining that the legal representative is authenticated based on the auxiliary authentication information.

In some embodiments, the receiving an enterprise authentication request comprises: receiving an enterprise authentication request from a second client device, wherein the second client device is operated by an agent that is different from the legal representative of the enterprise; and wherein the sending an obtaining request to a client device comprises: sending an obtaining request to the second client device.

In some embodiments, the receiving an enterprise authentication request comprises: receiving an enterprise authentication request from a second client device, wherein the second client device is operated by an agent that is different from the legal representative of the enterprise; and wherein the sending an obtaining request to a client device comprises: sending an obtaining request to the second client device.

In some embodiments, the method further comprises receiving agent identity information and an agent image that are sent by the second client device; and performing authentication on the agent according to the agent identity information and the agent image.

In some embodiments, after the generating an enterprise authentication record, the method further comprises: generating unique query credential information of the enterprise authentication record; and sending the unique query credential information to the client device for future queries of the enterprise authentication record.

In some embodiments, the writing the enterprise authentication record into the blockchain comprises: writing the enterprise authentication record and the query credential information into the blockchain; and creating a correspondence between the enterprise authentication record and the query credential information into the blockchain.

In some embodiments, the first database and the second database are stored in the blockchain, and are accessible by the first smart contract and the second smart contract.

According to another aspect, a system for blockchain-based enterprise authentication, comprising one or more processors and one or more non-transitory computer-readable memories coupled to the one or more processors and configured with instructions executable by the one or more processors to cause the system to perform operations comprising: receiving an enterprise authentication request, wherein the enterprise authentication request comprises to-be-authenticated enterprise information of an enterprise, to-be-authenticated identity information of a legal representative of the enterprise, and auxiliary authentication information; performing, through a first smart contract deployed in a blockchain, a first determination of whether the to-be-authenticated enterprise information matches with enterprise information stored in a first database; performing, through a second smart contract deployed in the blockchain, a second determination of whether the to-be-authenticated identity information matches with legal representative identity information stored in a second database; sending an obtaining request to a client device for auxiliary legal representative information according to the auxiliary authentication information; performing, through the second smart contract deployed in the blockchain, a third determination of whether the to-be-authenticated identity information is authenticated based on the auxiliary legal representative information; generating an enterprise authentication record if the first determination, the second determination, and the third determination are affirmative; and writing the enterprise authentication record into the blockchain.

According to yet another aspect, a non-transitory computer-readable storage medium for blockchain-based enterprise authentication, configured with instructions executable by one or more processors to cause the one or more processors to perform operations comprising: receiving an enterprise authentication request, wherein the enterprise authentication request comprises to-be-authenticated enterprise information of an enterprise, to-be-authenticated identity information of a legal representative of the enterprise, and auxiliary authentication information; performing, through a first smart contract deployed in a blockchain, a first determination of whether the to-be-authenticated enterprise information matches with enterprise information stored in a first database; performing, through a second smart contract deployed in the blockchain, a second determination of whether the to-be-authenticated identity information matches with legal representative identity information stored in a second database; sending an obtaining request to a client device for auxiliary legal representative information according to the auxiliary authentication information; performing, through the second smart contract deployed in the blockchain, a third determination of whether the to-be-authenticated identity information is authenticated based on the auxiliary legal representative information; generating an enterprise authentication record if the first determination, the second determination, and the third determination are affirmative; and writing the enterprise authentication record into the blockchain.

According to the blockchain-based enterprise authentication traceability method, apparatus, and device in one or more embodiments of the present specification, when an enterprise authentication query request is received, the enterprise authentication query request includes query credential information, a corresponding authentication record is looked up in a blockchain according to the query credential information, and the authentication record is sent to a client. It may be learned that, according to the embodiments of the present specification, the blockchain-based data cannot be tampered with and traceable, thereby achieving traceability query of enterprise authentication.

BRIEF DESCRIPTION OF THE DRAWINGS

To describe the technical solutions in one or more embodiments of the present specification or in the existing technologies more clearly, the following briefly describes the accompanying drawings required for describing the embodiments or the existing technologies. Apparently, the accompanying drawings in the following description merely show some embodiments recorded in the present specification, and a person of ordinary skill in the art may still derive other drawings from these accompanying drawings without creative efforts.

DETAILED DESCRIPTION OF THE INVENTION

For a better understanding of the technical solutions in one or more embodiments of this specification by those skilled in the art, the technical solutions in the one or more embodiments of this specification will be clearly and completely described below with reference to the accompanying drawings in the one or more embodiments of this specification. Apparently, the described embodiments are merely some rather than all of the embodiments of this specification.

One or more embodiments of the present specification provide a blockchain-based enterprise authentication method, apparatus, and system, and a blockchain-based trusted execution environment. An authentication process of an enterprise is transparent, so that credibility and notarization of the authentication process of the enterprise may be guaranteed, and authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

Figure 1:
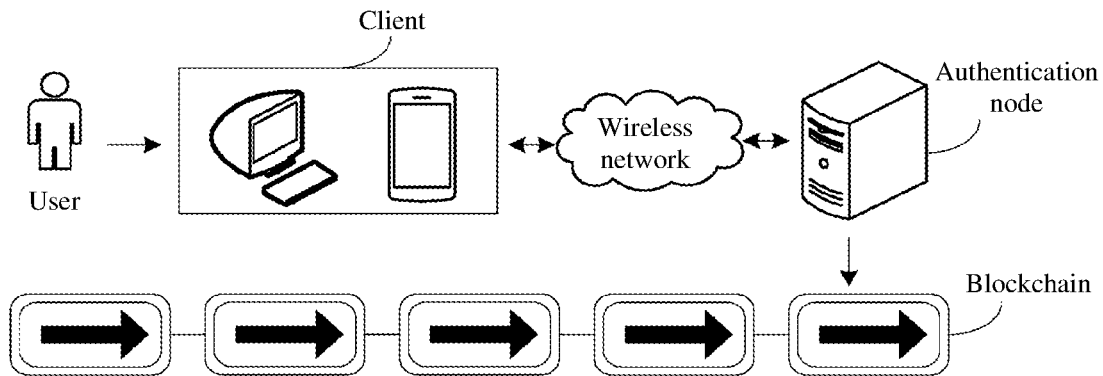
FIG. 1 is a schematic diagram of an exemplary scenario of a blockchain-based enterprise authentication system, according to one or more embodiments of the present specification.

FIG. 1 is a schematic diagram of an application scenario of a blockchain-based enterprise authentication system, according to one or more embodiments of the present specification. As shown in FIG. 1, the system includes: a client and an authentication node, where the client may be a mobile phone, a tablet, a desktop computer, a portable notebook computer, and the like, the authentication node is a node in a blockchain, and the client is communicatively connected to the authentication node through a wireless network.

The client is configured to send an enterprise authentication request to the authentication node in response to a trigger operation on an enterprise authentication event by a user, where the enterprise authentication request includes to-be-authenticated enterprise information of an enterprise, to-be-authenticated identity information of a legal representative of the enterprise (may also be called a legal person of the enterprise, or an enterprise legal person), and auxiliary authentication information. The to-be-authenticated enterprise information includes a name of the enterprise and a unified social credit code (Employer Identification Number, or TAX ID), etc., the legal representative identity information includes a name and an identity (ID) number of a corresponding legal representative of the enterprise, and the auxiliary authentication information includes information for further auxiliary authentication of the legal representative. A method of the auxiliary authentication may be one of authentication methods such as biometric authentication, account operation authentication, and authentication through contact information, or a combination of a plurality of authentication methods. Auxiliary authentication information may include biometric feature information, account operation information, and contact information. Further, the foregoing name of the enterprise, the unified social credit code, the name, and the ID number of the legal representative are collectively referred to as four elements of the enterprise. In one or more embodiments of the present specification, the enterprise information may further include a certificate type and a certificate number of an enterprise certificate. The enterprise certificate may be any one or more of a business license, an organization code certificate, a unified social credit code certificate, and a tax registration certificate. The auxiliary authentication information may further include contact information of the legal representative, where the contact information includes a mobile phone number, an email address, a social application account, and the like.

The authentication node is configured to: receive an enterprise authentication request sent by a client; perform authentication on an identity of an enterprise according to the enterprise information included in the enterprise authentication request, and perform authentication on an identity of a legal representative of the enterprise according to the legal representative identity information and the auxiliary authentication information that are included in the enterprise authentication request; generate an enterprise authentication record if the identity of the enterprise is authenticated and the identity authentication of the legal representative is authenticated, and write the generated enterprise authentication record into a blockchain. In some embodiments, after the authentication node obtains the enterprise authentication request sent by the client, a smart contract deployed in the blockchain is called, authentication is automatically performed on the identity of the enterprise according to the enterprise information based on the smart contract, auxiliary legal representative information is obtained according to the auxiliary authentication information, and authentication is performed on the identity of the legal representative according to the legal representative identity information and the auxiliary legal representative information. In addition, when the identities of the enterprise and the legal representative are authenticated, an enterprise authentication record is generated, and saved into a blockchain. In one or more embodiments of the present specification, the authentication record includes timestamp information of authentication of the identity of the enterprise and/or timestamp information of the authentication of the identity of the legal representative, which may further include enterprise information, legal representative identity information, and the like.

It may be noted that the client may further be communicatively connected to the authentication node through other devices. For example, the client is communicatively connected to a third-party server through a wireless network, and the third-party server is communicatively connected to the authentication node through a wireless network.

Accordingly, the authentication process on the enterprise is performed in a blockchain-based trusted execution environment, where the transparency, credibility, and notarization of the authentication process of the enterprise may be achieved. The authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

In one or more embodiments of the present specification, the client may only be operated by the legal representative to complete the authentication of the enterprise. Respective clients may alternatively be operated by the legal representative and a designated agent of the enterprise to jointly complete the authentication of the enterprise, where the agent does not include the legal representative. In order to facilitate distinction, a client operated by the legal representative is referred to as a first client, and a client operated by the agent is referred to as a second client.

Figure 2:
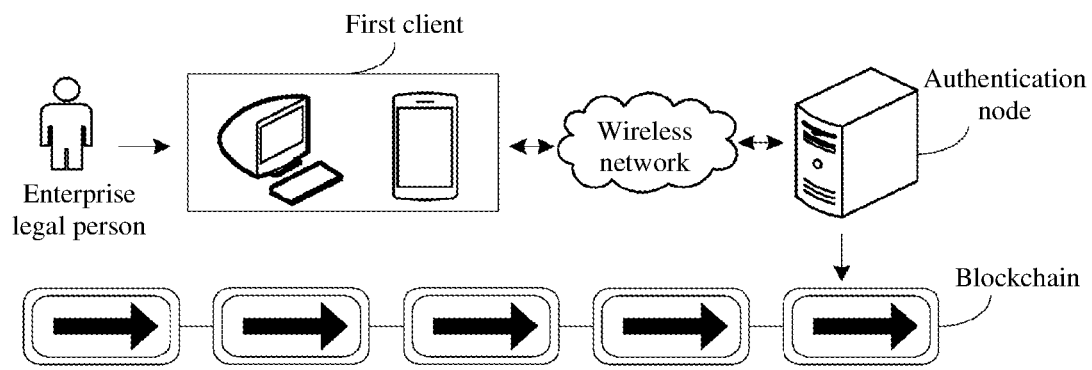
FIG. 2 is a schematic diagram of another exemplary scenario of a blockchain-based enterprise authentication system, according to one or more embodiments of the present specification.

If the first client is operated only by the legal representative of the enterprise to complete authentication of the enterprise, reference is made to FIG. 2. FIG. 2 is a schematic diagram of a further application scenario of a blockchain-based enterprise authentication system, according to one or more embodiments of the present specification. As shown in FIG. 2, the system includes: a first client and an authentication node.

The first client is configured to send an enterprise authentication request to the authentication node in response to a trigger operation on an enterprise authentication event by a legal representative of the enterprise, where the enterprise authentication request includes to-be-authenticated enterprise information, legal representative identity information, and auxiliary authentication information.

The authentication node is configured to: obtain an enterprise authentication request sent by the first client; perform authentication on an identity of an enterprise according to the enterprise information included in the enterprise authentication request, send an obtaining request of auxiliary legal representative information to the first client according to the auxiliary authentication information included in the enterprise authentication request, obtain auxiliary legal representative information generated by the first client by performing the corresponding operation of an obtaining request, and perform authentication on an identity of a legal representative of the enterprise according to the legal representative identity information and the obtained auxiliary authentication information that are included in the enterprise authentication request; generate an enterprise authentication record if the identity of the enterprise is authenticated and the identity of the legal representative is authenticated, and write the generated enterprise authentication record into a blockchain.

Figure 3:
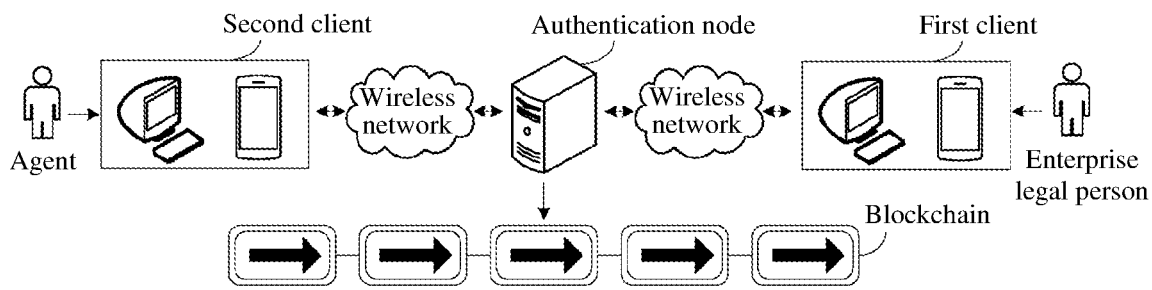
FIG. 3 is a schematic diagram of another exemplary scenario of a blockchain-based enterprise authentication system, according to one or more embodiments of the present specification.

If the first client is operated by the legal representative of the enterprise and the second client is operated by an agent designated by the enterprise to complete authentication of the enterprise, reference is made to FIG. 3. FIG. 3 is a schematic diagram of a further application scenario of a blockchain-based enterprise authentication system, according to one or more embodiments of the present specification. As shown in FIG. 3, the system includes: a first client, a second client, and an authentication node.

The second client is configured to send an enterprise authentication request to the authentication node in response to a trigger operation on an enterprise authentication event by an agent, where the enterprise authentication request includes to-be-authenticated enterprise information, legal representative identity information, and auxiliary authentication information.

The authentication node is configured to: perform authentication on an identity of an enterprise according to the enterprise information included in the enterprise authentication request, send an obtaining request of auxiliary legal representative information to the second client according to the auxiliary authentication information included in the enterprise authentication request, obtain auxiliary legal representative information generated by the second client by performing the corresponding operation of an obtaining request, and perform authentication on an identity of a legal representative of the enterprise according to the legal representative identity information and the obtained auxiliary authentication information that are included in the enterprise authentication request; generate an enterprise authentication record if the identity of the enterprise is authenticated and the identity of the legal representative is authenticated, and write the generated enterprise authentication record into a blockchain.

The second client is configured to receive an obtaining request of auxiliary legal representative information sent by the authentication node, and perform a corresponding operation according to the obtaining request to generate auxiliary legal representative information for the authentication node to perform authentication on the identity of the legal representative.

According to the foregoing enterprise authentication system, the authentication process on the enterprise is performed in a blockchain-based trusted execution environment, where the transparency, credibility, and notarization of the authentication process of the enterprise may be achieved. The authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

Figure 4:
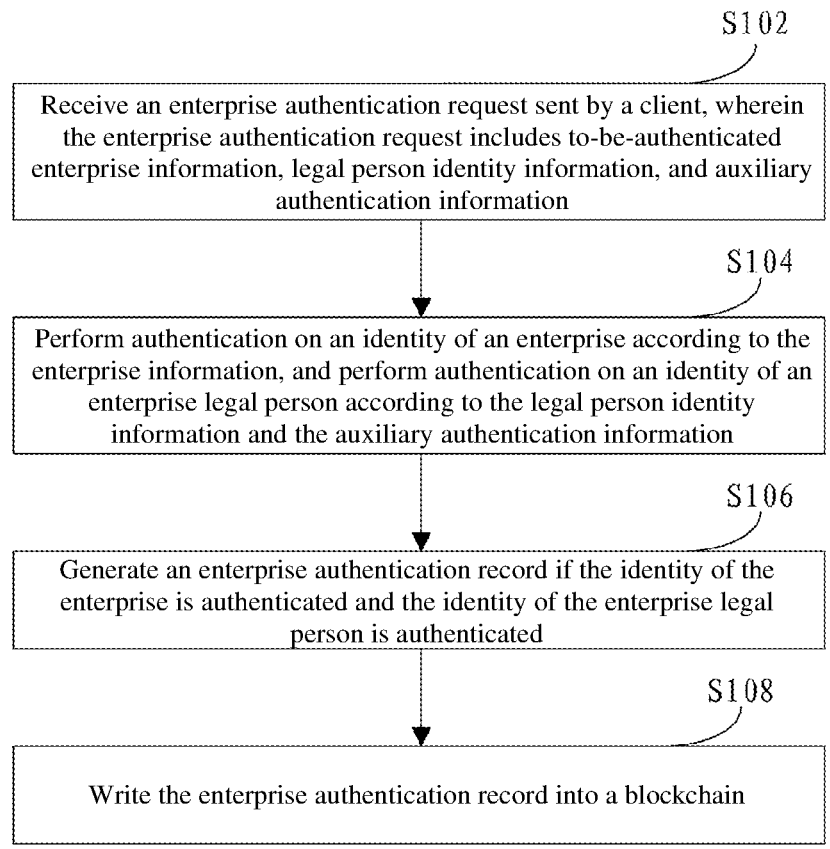
FIG. 4 is a schematic flowchart of a blockchain-based enterprise authentication method, according to one or more embodiments of the present specification.

FIG. 4 is a first schematic flowchart of a blockchain-based enterprise authentication method, according to one or more embodiments of the present specification. The method in FIG. 4 can be performed by the authentication node in FIG. 1 to FIG. 3. As shown in FIG. 4, the method includes the following steps.

Step S102: An enterprise authentication request sent by a client is received, where the enterprise authentication request includes to-be-authenticated enterprise information, legal representative identity information, and auxiliary authentication information.

The enterprise information includes a name of an enterprise and a unified social credit code, etc., the to-be-authenticated identity information of includes a name and an identity (ID) number of a legal representative of the enterprise, and the auxiliary authentication information includes information about further auxiliary authentication performed on the legal representative. A method for auxiliary authentication may be one of authentication methods such as biometric authentication, account operation authentication, and authentication through contact information, or a combination of a plurality of authentication methods. Corresponding auxiliary authentication information may include biometric feature information, account operation information, and contact information. Further, an account operation is, for example, a transfer operation to a designated account.

In one or more embodiments of the present specification, the enterprise information may further include a certificate type and a certificate number of an enterprise certificate. The enterprise certificate may be any one or more of a business license, an organization code certificate, a unified social credit code certificate, and a tax registration certificate. The auxiliary authentication information may further include contact information of the legal representative, where the contact information includes, but is not limited to, a mobile phone number, an email address, and a social application account.

Step S104: Authentication is performed on an identity of an enterprise according to the enterprise information, and authentication is performed on an identity of a legal representative of the enterprise according to the legal representative identity information and the auxiliary authentication information.

In some embodiments, a smart contract deployed in a blockchain is called, authentication is performed on an identity of an enterprise according to the enterprise information based on the smart contract, authentication is performed on an identity of a legal representative of the enterprise according to the legal representative identity information and the auxiliary authentication information, and timestamp information of the authenticated identity of the enterprise and timestamp information of the authenticated identity of the legal representative are recorded.

Step S106: An enterprise authentication record is generated if the identity of the enterprise is authenticated and the identity of the legal representative is authenticated.

The enterprise authentication record includes timestamp information of the authenticated identity of the enterprise (e.g., the timestamp when the identity of the enterprise is authenticated) and/or timestamp information of the authenticated identity of the legal representative (e.g., the timestamp when the identity of the legal representative is authenticated). In one or more embodiments of the present specification, the enterprise authentication record may further include enterprise information and/or legal representative identity information, etc. For example, when the identity of the enterprise is authenticated and the identity of the legal representative is authenticated, the authentication node generates the authentication record according to the enterprise name, the unified social credit code of the enterprise, the timestamp information of the authenticated identity of the enterprise, the name of the legal representative, an identity number of the legal representative, and timestamp information of the authenticated identity of the legal representative.

Step S108: The enterprise authentication record is written into a blockchain. In some embodiments, the authentication node uploads the generated enterprise authentication record to the blockchain for storage, so that the authentication process of the enterprise may be traced back, and the authentication result cannot be tampered with.

In one or more embodiments of the present specification, by adopting a blockchain-based trusted execution environment, an authentication process of the enterprise is transparent and visible to multiple parties, so that credibility and notarization of the authentication process of the enterprise may be guaranteed. The authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

It may be noted that the authentication process of an enterprise includes both the identity authentication process of the enterprise and the identity authentication process of the legal representative. In order to ensure the orderly execution of the authentication process, in one or more embodiments of the present specification, a plurality of smart contracts are deployed in the blockchain. Correspondingly, the performing authentication on an identity of an enterprise according to the enterprise information in step S104 includes: calling a first smart contract deployed in the blockchain, matching to-be-authenticated enterprise information with enterprise information stored in a database of a first designated organization based on the first smart contract, and determining that the identity of the enterprise is authenticated if the matching succeeds. The first designated organization is a trusted third-party organization with authority and legitimacy, of which a database stores related information of registered enterprises. The database is accessible to perform authentication on to-be-authenticated enterprise information.

In some embodiments, the database of the first designated organization is stored in the blockchain, and is accessible through a first access interface included in the first smart contract. If the to-be-authenticated enterprise information is found in the database of the first designated organization, it is determined that the matching succeeds, and the identity of the enterprise is authenticated. If it is determined that the to-be-authenticated enterprise information is not stored in the database of the first designated organization, it is determined that the matching fails, and the identity of the enterprise is not authenticated. Alternatively, the first smart contract deployed in the blockchain is called, and the enterprise information is sent to the first designated organization through the first access interface included in the first smart contract. The first designated organization determines whether the received enterprise information is stored in the database of the first designated organization, and sends a determining result to the authentication node. The authentication node determines a type of the received determining result. If the first designated organization determines that the received enterprise information is stored in the database of the first designated organization, it is determined that the matching succeeds, and the identity of the enterprise is authenticated. If the first designated organization determines that the received enterprise information is not stored in the database of the first designated organization, it is determined that the matching fails, and the identity of the enterprise is not authenticated. The first designated organization is, for example, the Trade and Industry Bureau.

In one or more embodiments of the present specification, when the identity of the enterprise is authenticated, the method further includes: recording timestamp information of the authenticated identity of the enterprise (e.g., timestamp when the identity of the enterprise is authenticated) to facilitate subsequent traceability of the authentication process of the enterprise.

Therefore, based on the first smart contract, the identity authentication of the enterprise is automatically completed without manual participation, which improves authentication efficiency. In addition, based on the open and transparent feature of the blockchain, it is ensured that the data in the database of the first designated organization will not be copied and backed up randomly, thereby ensuring data security.

Further, the performing authentication on an identity of a legal representative of the enterprise according to the legal representative identity information and the auxiliary authentication information in step S104 includes: step S202: calling a second smart contract deployed in a blockchain, and matching, based on the second smart contract, to-be-authenticated legal representative identity information with the legal representative identity information stored in a database of a second designated organization; step S204: determining whether the legal representative can be aauthenticated through the authentication method corresponding to the auxiliary authentication information; and step S206: determining that the identity of the legal representative is authenticated if the matching of the to-be-authenticated legal representative identity information with legal representative identity information stored in the database of the second designated organization succeeds, and the legal representative is authenticated through the authentication method corresponding to the auxiliary authentication information.

The process of matching the to-be-authenticated legal representative identity information with the legal representative identity information stored in the database of the second designated organization based on the second smart contract is similar to the process of matching the to-be-authenticated enterprise information with the enterprise information stored in the database of the first designated organization based on the first smart contract, and details are not described herein again. The second designated organization is a trusted third-party organization with authority and legitimacy, of which a database stores identity information and images of users. The database may be accessed to authenticate the identity information of the legal representative. The second designated organization is, for example, the public security bureau.

In one or more embodiments of the present specification, when the identity of the legal representative is authenticated, the method further includes: recording timestamp information of the authenticated identity of the legal representative to facilitate subsequent traceability of the authentication process of the enterprise.

Therefore, based on the second smart contract, the identity authentication of the legal representative is automatically completed without manual participation, which improves authentication efficiency. In addition, based on the open and transparent feature of the blockchain, it is ensured that the data in the database of the second designated organization will not be copied and backed up randomly, thereby ensuring data security.

Figure 5:
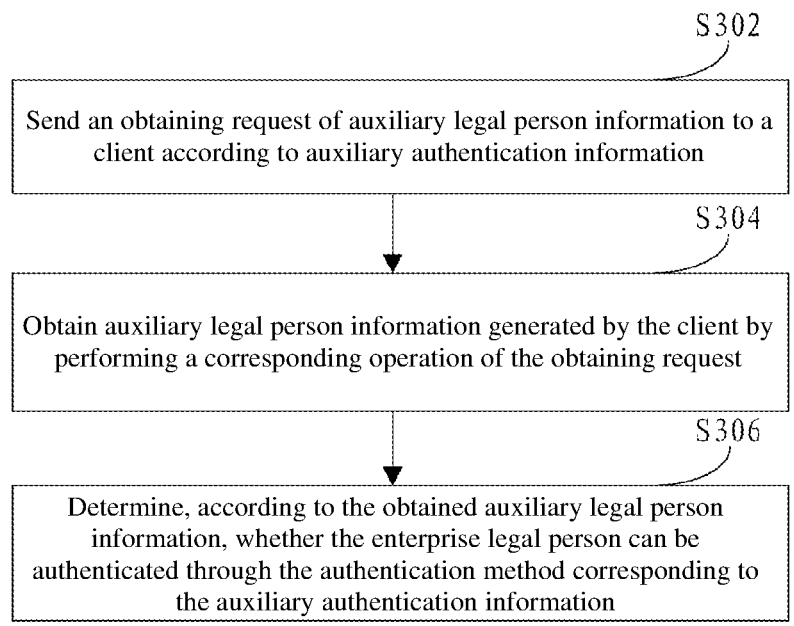
FIG. 5 is a diagram of a method for authenticating a legal representative of an enterprise, according to one or more embodiments of the present specification.

In order to ensure authenticity and validity of the identity of the legal representative, in the embodiment of the present specification, in addition to a method of performing authentication on the identity of a legal representative according to the legal representative identity information, the authentication method corresponding to the auxiliary authentication information is used to perform secondary authentication on the identity of the legal representative. The authentication method corresponding to the auxiliary authentication information may be biometric authentication, or may be account operation authentication. In some embodiments, as shown in FIG. 5, step S204 includes: step S302, sending an obtaining request of auxiliary legal representative information to a client according to auxiliary authentication information; step S304, obtaining auxiliary legal representative information generated by the client by performing a corresponding operation of the obtaining request; and step S306, determining, according to the obtained auxiliary legal representative information, whether the legal representative is authenticated through the authentication method corresponding to the auxiliary authentication information.

Therefore, after the auxiliary legal representative information is obtained, secondary authentication is performed on the identity of the legal representative according to the auxiliary legal representative information, greatly ensuring authenticity and validity of the legal representative identity.

Figure 6:
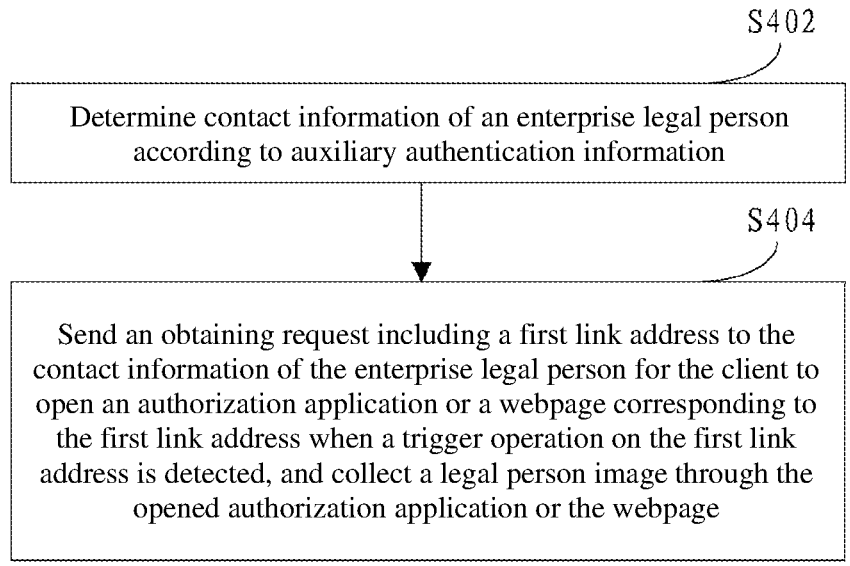
FIG. 6 is a diagram of another method for authenticating a legal representative of an enterprise, according to one or more embodiments of the present specification.

In one or more embodiments of the present specification, the authentication method corresponding to the auxiliary authentication information is biometric authentication. Correspondingly, as shown in FIG. 6, step S302 includes: step S402, determining contact information of a legal representative of the enterprise according to auxiliary authentication information.

Considering that the legal representative is usually busy, in order to facilitate the operation of the legal representative, in the embodiments of the present specification, a plurality of collection methods for a legal representative image are provided. The legal representative image may be collected through an authorization application with an image collection function, and the legal representative image may further be collected through a webpage. Correspondingly, the auxiliary authentication information further includes collection method information. In some embodiments, if the legal representative image is collected through an authorization application, the collection method information may include account information of the authorization application. For example, an authorization application is Alipay™, account information is an Alipay™ account, and the authentication node obtains corresponding contact information from an association relationship between prestored account information and the contact information according to the account information, and determines the obtained contact information as contact information of the legal representative. The collection method information may further include contact information, and the authentication node determines the contact information in the collection method information as the contact information of the legal representative. If the legal representative image is collected through a webpage, the collection method information may include contact information, and the authentication node determines the contact information in the collection method information as the contact information of the legal representative. The contact information may be a mobile phone number, an email address, a social application account, and the like.

Step S404: An obtaining request including a first link address is sent to the contact information of the legal representative for the client to open an authorization application or a webpage corresponding to the first link address when a trigger operation (e.g., click) on the first link address is detected, and a legal representative image is collected through the opened authorization application or the webpage.

For example, if the determined contact information of the legal representative is a mobile phone number, an obtaining request including the first link address is sent to the mobile phone number in the form of a short message. For another example, if the determined contact information of the legal representative is an email address, an obtaining request including the first link address is sent to the email in the form of an email.

Considering that some clients do not support the image collection function, such as a desktop computer without a camera, enterprise authentication may not be implemented smoothly. Based on this, in one or more embodiments of the present specification, the opening, by the client, an authorization application or a webpage corresponding to the first link address includes: detecting, by the client, whether a current environment supports an image collection function; if so, opening the authorization application or the webpage corresponding to the first link address; if not, generating a QR code of the authorization application or the webpage, and displaying the QR code and first prompt information on a page corresponding to the first link address, where the first prompt information is used to prompt scanning of the QR code through a smart terminal to open an authorization application or a webpage corresponding to the QR code through the smart terminal.

The client detects whether the current environment supports the image collection function, effectively avoiding the risk of enterprise authentication failure because the current environment does not support the image collection function.

Further, when the legal representative image is collected through the authorization application, considering that the authorization application is not installed on the client, the enterprise authentication is prevented from being performed smoothly. Based on this, in one or more embodiments of the present specification, the opening, by the client, an authorization application or a webpage corresponding to the first link address further includes: detecting whether an authorization application is already installed in the current environment; if so, opening an authorization application corresponding to the first link address; if not, displaying second prompt information, where the second prompt information is used to prompt downloading of the authorization application, and open the authorization application after the authorization application is downloaded.

The client detects whether the authorization application is installed in the current environment, effectively avoiding the risk of enterprise authentication failure because the authorization application is not installed in the current environment.

Further, in order to ensure the authenticity of the identity of the legal representative, the collecting, by the client, the legal representative image through the authorization application or the webpage includes: if it is determined that the legal representative performs the authorization application or the webpage to instruct an action performed by the legal representative, collecting the legal representative image through the authorization application or the webpage.

Further, when step S302 includes the foregoing step S402 to step S404, step S304 includes: obtaining the legal representative image collected by the client; correspondingly, step S306 includes: matching the obtained the legal representative image with legal representative image stored in the database of the second designated organization, and if the matching succeeds, determining that the legal representative is authenticated through the authentication method corresponding to the auxiliary authentication information.

In some embodiments, the database of the second designated organization is stored in the blockchain, and is accessible through a second access interface included in the second smart contract. The legal representative image corresponding to the legal representative identity information is looked up in the database of the second designated organization, and the obtained legal representative image is matched with the found legal representative image. If the matching succeeds, it is determined that the legal representative is authenticated through the authentication method corresponding to the authentication information, and if the matching fails, it is determined that the legal representative fails to be authenticated through the authentication method corresponding to the authentication information. Alternatively, the legal representative identity information and the obtained legal representative image are sent to the second designated organization through the second access interface included in the second smart contract. The second designated organization searches the database for the corresponding legal representative image according to the received legal representative identity information, matches the received legal representative image with the found legal representative image, and returns the matching result to the authentication node. The authentication node determines a type of the matching result. If the matching result is a successful match, it is determined that the legal representative is authenticated through the authentication method corresponding to the authentication information. If the matching result is a matching failure, it is determined that the legal representative fails to be authenticated through the authentication method corresponding to the authentication information.

Therefore, the legal representative image is obtained according to the auxiliary authentication information included in the enterprise authentication request, and secondary authentication is performed on the identity of the legal representative according to the legal representative image to ensure the authenticity and validity of the identity of the legal representative, thereby ensuring the authenticity and validity of the enterprise authentication result.

Figure 7:
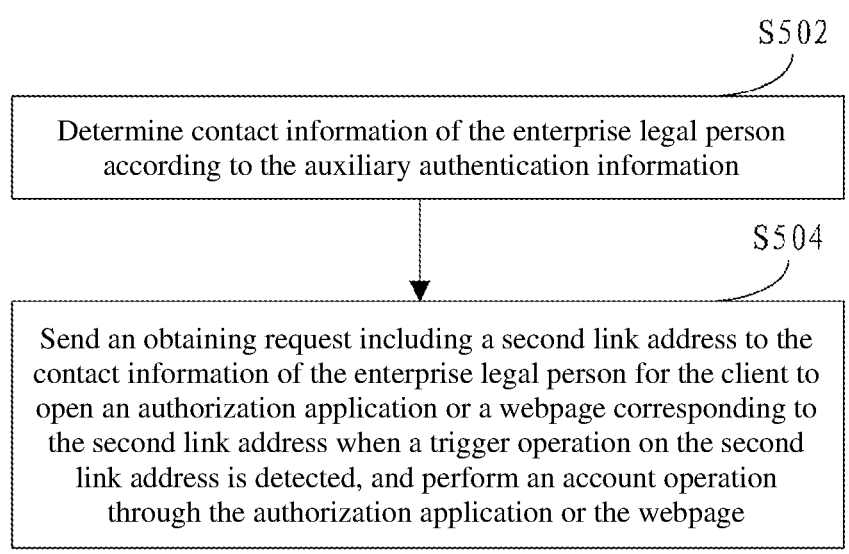
FIG. 7 is a diagram of another method for authenticating a legal representative of an enterprise, according to one or more embodiments of the present specification.

In one or more embodiments of the present specification, the authentication method corresponding to the auxiliary authentication information is account operation authentication, where the account operation may be a transfer operation. For example, a legal representative of the enterprise executes a transfer operation with a preset transfer amount to a financial account of the enterprise through an authorization application or a webpage. Correspondingly, as shown in FIG. 7, step S302 includes: step S502, determining contact information of the legal representative according to the auxiliary authentication information.

An implementation method of step S502 is similar to an implementation method of the foregoing step S402, and details are not described herein again. It may be noted that, in order to facilitate subsequent authentication nodes to obtain the operation record corresponding to the account operation performed by the client, the auxiliary authentication information further includes account information, such as account information of an enterprise financial account and account information of the legal representative, where the account information is, for example, a debit card number.

Step S504: An obtaining request including a second link address is sent to the contact information of the legal representative for the client to open an authorization application or a webpage corresponding to the second link address when a trigger operation on the second link address is detected, and an operation is performed on an account through the authorization application or the webpage.

The obtaining request may further include a preset transfer amount for the subsequent authentication node to obtain an accurate operation record according to the preset transfer amount. Further, the method for opening, by the client, the authorization application or the webpage corresponding to the second link address is the same as the foregoing method for opening, by the client, the authorization application or the webpage corresponding to the first link address, and details are not described herein again.

Further, when step S302 includes the foregoing step S502 to step S504, step S304 includes: accessing a database of a third designated organization through a third access interface in the second smart contract, and looking up, according to the account information and the preset transfer amount included in the auxiliary authentication information, a corresponding operation record in operation records stored in the database of the third designated organization. Alternatively, an obtaining request of the operation record is sent to a third designated organization through a third access interface in the second smart contract, where the obtaining request of the operation record includes account information and a preset transfer amount. The third designated organization looks up, according to the account information and the preset transfer amount, a corresponding operation record in the operation record stored in the database of the third designated organization, and sends the found operation record to the authentication node. The third designated organization is a trusted third-party organization with authority and legitimacy, of which a database stores an operation record of a registered account. The database is accessed to perform auxiliary authentication on an identity of the legal representative. The third designated organization is, for example, a bank.

Correspondingly, step S306 includes: determining whether the obtained operation record corresponding to the account operation meets a preset condition; and if so, determining that the legal representative is authenticated through the authentication method corresponding to the auxiliary authentication information.

In some embodiments, whether time information included in the obtained operation record is within a valid time range needs to be determined. If yes, it is determined that the obtained operation record corresponding to the account operation meets the preset condition. The valid time range may be a preset duration since a time when the obtaining request of the auxiliary legal representative information is sent, for example, within 2 minutes since a time when the obtaining request of the auxiliary legal representative information is sent. The valid time range of the account operation is set, which may avoid malicious operations and ensure the authenticity of the identity of the legal representative.

Therefore, the operation record for the legal representative to perform the account operation is obtained according to the auxiliary authentication information included in the enterprise authentication request, and secondary authentication is performed on the identity of the legal representative according to the operation record to ensure the authenticity and validity of the identity of the legal representative, thereby ensuring the authenticity and validity of the enterprise authentication result.

In one or more embodiments of the present application, in order to increase an authentication rate, authentication may be performed on the identity of the enterprise and the identity of the legal representative at the same time. Correspondingly, the first smart contract is the same as the second smart contract, and the authentication node performs authentication on the identity of the enterprise and the identity of the legal representative based on the smart contract after calling the smart contract. For the specific authentication process, reference is made to the foregoing related descriptions, and details are not described herein again.

In one or more embodiments of the present specification, the first client is operated only by the legal representative to complete the authentication of the enterprise. Correspondingly, step S102 includes: receiving an enterprise authentication request sent by a first client; and the sending an obtaining request of auxiliary legal representative information to the client in step S302 includes: sending the obtaining request of the auxiliary legal representative information to the first client.

In one or more embodiments of the present specification, the first client is operated by the legal representative, and a second client is operated by an agent to complete the authentication of the enterprise. Correspondingly, step S102 includes: receiving an enterprise authentication request sent by the second client; and the sending an obtaining request of auxiliary legal representative information to the client in step S302 includes: sending the obtaining request of the auxiliary legal representative information to the first client.

Further, if the first client is operated by the legal representative, and a second client is operated by an agent to complete the authentication of the enterprise, the method further includes: step S602: receiving agent identity information and an agent image that are sent by the second client; and step S604: performing authentication on an agent identity according to the agent identity information and the agent image.

The agent identity information includes a name and an identity number of the agent, etc. The process of obtaining the agent image in step S602 is similar to the foregoing process of obtaining the legal representative image, and the implementation method of step S604 is similar to the foregoing process of performing authentication on the identity of the legal representative according to the legal representative identity information and the legal representative image. Details are not described herein again.

In one or more embodiments of the present specification, when the identity of the agent is authenticated, the method further includes: recording timestamp information of the authenticated identity of the agent to facilitate the subsequent traceability of the authentication process of the enterprise.

Further, if the first client is operated by the legal representative, and a second client is operated by the agent to complete the authentication of the enterprise, in order to increase authentication accuracy of the identity of the legal representative and ensure the authenticity of the identity of the legal representative, in one or more embodiments of the present specification, before step S302, the method may further include: receiving the legal representative identity information sent by the second client, and if it is determined that the received legal representative identity information is consistent with the legal representative identity information included in the enterprise authentication request, and sending an image collection request to the second client for the second client to collect the legal representative image through the currently opened authorization application or webpage.

In some embodiments, when the authorization application or the webpage corresponding to the second link address is opened, the second client first obtains the legal representative identity information submitted by the legal representative through operating the authorization application or webpage, and sends the obtained legal representative identity information to the authentication node. When the second client receives the image obtaining request sent by the authentication node, the legal representative image is collected through the currently opened authorization application or the webpage.

Further, when the contact information of the determined legal representative is a mobile phone number, a verification code may further be sent to the mobile phone number, and the identity of the legal representative is further verified based on the verification code.

In order to ensure the convenient traceability of the enterprise authentication process, in one or more embodiments of the present specification, after step S106, the method further includes: determining query credential information of the enterprise credential record, and sending the query credential information to the client for the client to query the enterprise authentication record according to the query credential information.

The determining query credential information of the enterprise authentication record includes: allocating unique query credential information to the enterprise authentication record, or determining, as the query certificate information of the enterprise authentication record, the certificate number of the enterprise certificate participating in the enterprise authentication, or determining, as the query credential information of the enterprise authentication record, the identity number of the legal representative participating in the enterprise authentication.

Correspondingly, step S108 includes: correspondingly writing the enterprise authentication record and the query credential information into a blockchain to look up a corresponding enterprise authentication record in the blockchain according to the query credential information.

Further, after step S108, the method further includes: establishing a correspondence between the query credential information and a block identifier that is of a block and that is written into the enterprise authentication record, to determine a corresponding block according to the query credential information and the established correspondence, and further look up the corresponding enterprise authentication record in the block when an enterprise authentication query request including the query credential information is received.

Figure 8:
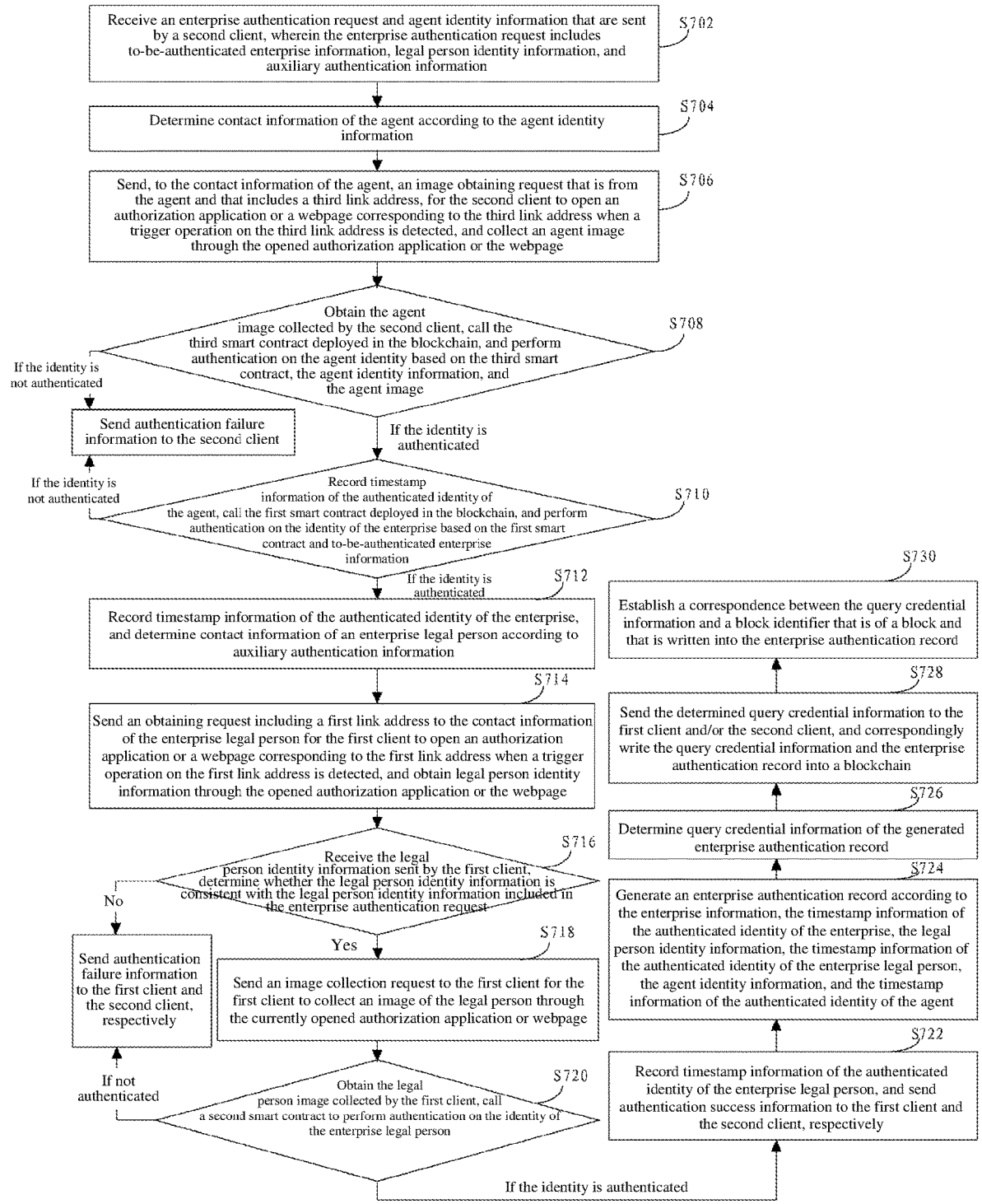
FIG. 8 is a schematic flowchart of a blockchain-based enterprise authentication method, according to one or more embodiments of the present specification.

In a specific embodiment, that a plurality of smart contracts are deployed in the blockchain, the legal representative operates the first client, and the agent operates the second client to jointly complete the enterprise authentication, and the authentication method corresponding to the auxiliary authentication information is biometric authentication is used as an example for specific description. As shown in FIG. 8, the method includes: step S702, receiving an enterprise authentication request and agent identity information that are sent by a second client, where the enterprise authentication request includes to-be-authenticated enterprise information, legal representative identity information, and auxiliary authentication information; step S704, determining contact information of the agent according to the agent identity information.

In some embodiments, the agent identity information may include a name of the agent, an ID number of the agent, and account information of an authorization application selected by the agent, etc. Correspondingly, according to the account information of the authorization application selected by the agent, the corresponding contact information is obtained from a correspondence between the prestored account information and the contact information, and the obtained contact information is determined as the contact information of the agent. Alternatively, the agent identity information includes a name, the ID number, the contact information, and the like that are of the agent. Correspondingly, the contact information is determined as the contact information of the agent.

Step S706: An image obtaining request that is from the agent and that includes a third link address is sent to the contact information of the agent for the second client to open an authorization application or a webpage corresponding to the third link address when a trigger operation on the third link address is detected, and an agent image is collected through the opened authorization application or the webpage.

Step S708: The agent image collected by the second client is obtained, the third smart contract deployed in the blockchain is called, and authentication is performed on the agent identity based on the third smart contract, the agent identity information, and the agent image. If the agent identity is authenticated, step S710 is performed. If the agent identity is not authenticated, authentication failure information is sent to the second client.

In some embodiments, based on the third smart contract, the agent identity information is matched with the agent identity information stored in the database of the second designated organization, and the agent image is matched with the agent image stored in the database of the second designated organization. If both matching succeeds, it is determined that the identity of the agent is authenticated.

Step S710: Timestamp information of the authenticated identity of the agent is recorded, the first smart contract deployed in the blockchain is called, and authentication is performed on the identity of the enterprise based on the first smart contract and to-be-authenticated enterprise information. If the identity of the enterprise is authenticated, step S712 is performed. If the identity of the enterprise is not authenticated, authentication failure information is sent to the second client.

In some embodiments, the first smart contract deployed in the blockchain is called, the to-be-authenticated enterprise information is matched with the enterprise information stored in a database of a first designated organization based on the first smart contract, and if the matching succeeds, it is determined that the identity of the enterprise is authenticated.

Step S712: Timestamp information of the authenticated identity of the enterprise is recorded, and contact information of a legal representative of the enterprise is determined according to auxiliary authentication information.

Step S714: An obtaining request including a first link address is sent to the contact information of the legal representative for the first client to open an authorization application or a webpage corresponding to the first link address when a trigger operation on the first link address is detected, and legal representative identity information is obtained through the opened authorization application or the webpage.

Step S716: The legal representative identity information sent by the first client is received, and it is determined whether the received legal representative identity information is consistent with the legal representative identity information included in the enterprise authentication request. If so, step S718 is performed, and if not, authentication failure information is sent to the first client and the second client, respectively.

Step S718: An image collection request is sent to the first client for the first client to collect a legal representative image through the currently opened authorization application or webpage.

Step S720: The legal representative image collected by the first client is obtained, the second smart contract deployed in the blockchain is called, and authentication is performed on the identity of the legal representative based on the second smart contract, the legal representative identity information, and the legal representative image. If the identity of the legal representative is authenticated, step S722 is performed. If the identity of the legal representative is authenticated, authentication failure information is sent to the first client and the second client, respectively.

The second smart contract may be the same as or different from the foregoing third smart contract.

Step S722: Timestamp information of the authenticated identity of the legal representative is recorded, and authentication success information is sent to the first client and the second client, respectively.

Step S724: An enterprise authentication record is generated according to the enterprise information, the timestamp information of the authenticated identity of the enterprise, the legal representative identity information, the timestamp information of the authenticated identity of the legal representative, the agent identity information, and the timestamp information of the authenticated identity of the agent.

Step S726: Query credential information of the generated enterprise authentication record is determined.

Step S728: The determined query credential information is sent to the first client and/or the second client, and the query credential information and the enterprise authentication record are correspondingly written into the blockchain.

Step S730: A correspondence between the query credential information and a block identifier that is of a block and that is written into the enterprise authentication record is established.

It may be noted that, for specific implementations of one or more steps in the foregoing steps S702 to S730, reference may be made to the foregoing related descriptions, and repeated parts are omitted.

In one or more embodiments of the present specification, when an enterprise authentication request sent by a client is received, where the enterprise authentication request includes to-be-authenticated enterprise information, legal representative identity information, and auxiliary authentication information. Authentication is performed on an identity of an enterprise according to the enterprise information, and authentication is performed on an identity of legal representative of the enterprise according to the legal representative identity information and the auxiliary authentication information. If the identity of the enterprise is authenticated and the identity of the legal representative is authenticated, an enterprise authentication record is generated, and the enterprise authentication record is written into a blockchain. It may be learned that, according to the embodiments of the present specification, by adopting a blockchain-based trusted execution environment, transparency, credibility and notarization of the authentication process of the enterprise may be guaranteed. The authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

Figure 9:
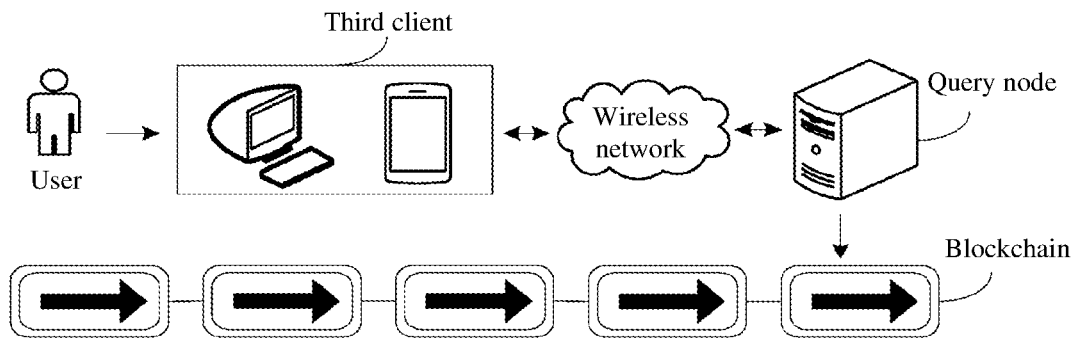
FIG. 9 is a schematic diagram of a scenario of a blockchain-based enterprise authentication traceability system, according to one or more embodiments of the present specification.

Based on the foregoing embodiments, one or more embodiments of the present specification further provide a blockchain-based enterprise authentication traceability method. FIG. 9 is a schematic diagram of an application scenario of a blockchain-based enterprise authentication traceability system, according to one or more embodiments of the present specification. As shown in FIG. 9, the system includes: a third client and a query node, where the third client may be a mobile phone, a tablet, a desktop computer, a portable notebook computer, and the like, and the query node is a node in a blockchain. The third client is communicatively connected to the query node through a wireless network. It may be noted that the third client may be the first client operated by a legal representative of the enterprise, or may be the second client operated by the agent, and may further be a client operated by a user with query permission. The query node and the authentication nodes in FIG. 1 to FIG. 3 may be a same node, or may be a different node.

The third client is configured to send an enterprise authentication query request to the query node in response to a trigger operation on an enterprise authentication query event by a user, where the enterprise authentication query request includes query credential information.

The query node is configured to: receive an enterprise authentication query request sent by the third client, look up a corresponding enterprise authentication record in the blockchain according to the query credential information, and send the enterprise authentication record to the third client.

In some embodiments, the third client may further be communicatively connected to the query node through other devices. For example, the third client is communicatively connected to a third-party server through a wireless network, and the third-party server is communicatively connected to the query node through a wireless network.

Accordingly, the blockchain-based data cannot be tampered with and traceable, thereby achieving traceability query of enterprise authentication.

Figure 10:
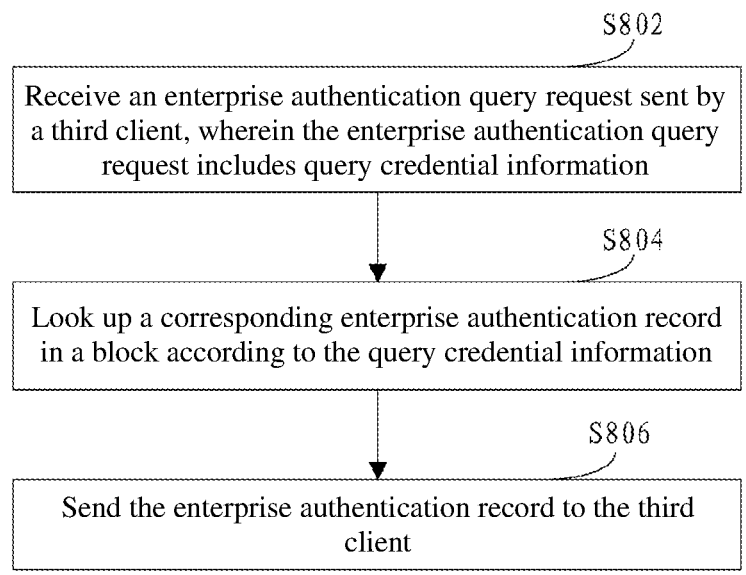
FIG. 10 is a schematic flowchart of a blockchain-based enterprise authentication traceability method, according to one or more embodiments of the present specification.

FIG. 10 is a schematic flowchart of another blockchain-based enterprise authentication traceability method, according to one or more embodiments of the present specification, the method being applied to the query node in FIG. 9. As shown in FIG. 10, the method includes: step S802, receiving an enterprise authentication query request sent by a third client, where the enterprise authentication query request includes query credential information.

The query credential information corresponds to the unique enterprise authentication record. The query credential information is determined after the authentication node generates the authentication record, which may be an identification code allocated to the authentication node, may further be a certificate number of an enterprise certificate participating in the enterprise authentication, and may further be an ID number of the legal representative.

It may be noted that the third client in the present embodiment may be the first client operated by a legal representative of the enterprise, or may be the second client operated by the agent, and may further be a client operated by a user with query permission.

Step S804: A corresponding enterprise authentication record is looked up in a blockchain according to the query credential information.

In some embodiments, a corresponding block identifier is obtained from a correspondence between the prestored query credential information and the block identifier according to the query credential information. A target block is looked up according to the obtained block identifier, and a corresponding enterprise authentication record is looked up, according to the query credential information, in data stored in the target block.

Step S806: The enterprise authentication record is sent to the third client.

In one or more embodiments of the present specification, when an enterprise authentication query request is received, the enterprise authentication query request includes query credential information, a corresponding enterprise authentication record is looked up in a blockchain according to the query credential information, and the enterprise authentication record is sent to a client. According to the embodiments of the present specification, the blockchain-based data cannot be tampered with and traceable, thereby achieving traceability query of enterprise authentication.

Figure 11:
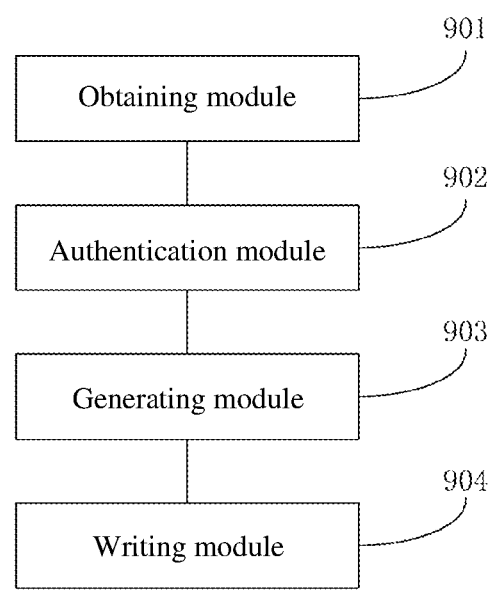
FIG. 11 is a schematic diagram of constituent modules of a blockchain-based enterprise authentication apparatus, according to one or more embodiments of the present specification.

Corresponding to the blockchain-based enterprise authentication method in FIG. 4 to FIG. 8, based on a same technical concept, one or more embodiments of the present specification further provide a blockchain-based enterprise authentication apparatus. FIG. 11 is a schematic diagram of constituent modules of a blockchain-based enterprise authentication apparatus, according to one or more embodiments of the present specification. The apparatus is configured to perform the blockchain-based enterprise authentication method described in FIG. 4 to FIG. 8. As shown in FIG. 11, the apparatus includes: an obtaining module 901 configured to obtain an enterprise authentication request sent by a client, where the enterprise authentication request includes to-be-authenticated enterprise information, legal representative identity information, and auxiliary authentication information; an authentication module 902 configured to perform authentication on an identity of an enterprise according to the enterprise information, and perform authentication on an identity of a legal representative of the enterprise according to the legal representative identity information and the auxiliary authentication information; a generating module 903 configured to generate an enterprise authentication record if the identity of the enterprise is authenticated and the identity of the legal representative is authenticated; and a writing module 904 configured to write the enterprise authentication record into a blockchain.

In one or more embodiments of the present specification, by adopting a blockchain-based trusted execution environment, an authentication process of the enterprise is transparent and visible to multiple parties, so that credibility and notarization of the authentication process of the enterprise may be guaranteed, and authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

In some embodiments, the authentication module 902 is configured to: call a first smart contract deployed in the blockchain, and match, based on the first smart contract, the to-be-authenticated enterprise information with enterprise information stored in a database of a first designated organization; and if the matching succeeds, determine that the identity of the enterprise is authenticated.

In some embodiments, the authentication module 902 is further configured to: call a second smart contract deployed in the blockchain, match, based on the second smart contract, to-be-authenticated legal representative identity information with legal representative identity information stored in a database of a second designated organization, and determine whether a legal representative of the enterprise is authenticated through the authentication method corresponding to the auxiliary authentication information; and determine that the identity of the legal representative is authenticated if the matching of the to-be-authenticated legal representative identity information with the legal representative identity information stored in the database of the second designated organization succeeds, and the legal representative is authenticated through the authentication method corresponding to the auxiliary authentication information.

In some embodiments, the authentication record includes: timestamp information of the authenticated identity of the enterprise and/or timestamp information of the authenticated identity of the legal representative.

In some embodiments, the authentication module 902 is further configured to: send an obtaining request of auxiliary legal representative information to the client according to the auxiliary authentication information; obtain the auxiliary legal representative information generated by the client by performing a corresponding operation of the obtaining request; and determine, according to the obtained auxiliary legal representative information, whether the legal representative is authenticated through the authentication method corresponding to the auxiliary authentication information.

In some embodiments, the authentication module 902 is further configured to: determine contact information of the legal representative according to the auxiliary authentication information; and send an obtaining request including a first link address to the contact information of the legal representative, so that the client opens an authorization application or a webpage corresponding to the first link address when a trigger operation on the first link address is detected, and collect a legal representative image through the authorization application or the webpage; and match the obtained the legal representative image with the legal representative image stored in the database of the second designated organization; and determine that the legal representative is authenticated through the authentication method corresponding to the auxiliary authentication information if the matching succeeds.

In some embodiments, the authentication module 902 is further configured to: determine contact information of the legal representative according to the auxiliary authentication information; send an obtaining request including a second link address to the contact information of the legal representative, so that the client opens an authorization application or a webpage corresponding to the second link address when a trigger operation on the second link address is detected, and perform an account operation through the authorization application or the webpage; and determine whether the obtained operation record corresponding to the account operation meets a preset condition; and if so, determine that the legal representative is authenticated through the authentication method corresponding to the auxiliary authentication information.

In some embodiments, the obtaining module 901 is configured to: obtain an enterprise authentication request sent by a first client, where the first client is operated by a legal representative of the enterprise.

Correspondingly, the authentication module 902 is further configured to: send the obtaining request of the auxiliary legal representative information to the first client.

In some embodiments, a receiving module 9501 is configured to: receive an enterprise authentication request sent by a second client, where the second client is operated by an agent, and the agent does not include the legal representative.

Correspondingly, the authentication module 902 is further configured to: send the obtaining request of the auxiliary legal representative information to the first client.

In some embodiments, the authentication module 902 is further configured to: receive agent identity information and an agent image that are sent by the second client; and perform authentication on an identity of the agent according to the agent identity information and the agent image.

In some embodiments, the apparatus further includes: a determining module and a sending module. The determining module is configured to determine query credential information of the enterprise authentication record after the generating module 903 generates an enterprise authentication record. The sending module is configured to send the query credential information to the client, so that the client queries the enterprise authentication record according to the query credential information.

In some embodiments, the writing module 904 is In some embodiments configured to: correspondingly write the enterprise authentication record and the query credential information into the blockchain.

The blockchain-based enterprise authentication apparatus provided in one or more embodiments of the present specification can receive an enterprise authentication request sent by a client, where the enterprise authentication request includes to-be-authenticated enterprise information, legal representative identity information, and auxiliary authentication information. Authentication is performed on an identity of an enterprise according to the enterprise information, and authentication is performed on an identity of a legal representative of the enterprise according to the legal representative identity information and the auxiliary authentication information. If the identity of the enterprise is authenticated and the identity of the legal representative is authenticated, an enterprise authentication record is generated, and the enterprise authentication record is written into a blockchain. It may be learned that, according to the embodiment of the present specification, by adopting a blockchain-based trusted execution environment, an authentication process of the enterprise is transparent and visible to multiple parties, so that credibility and notarization of the authentication process of the enterprise may be guaranteed, and authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

It may be noted that the embodiment of the blockchain-based enterprise authentication apparatus in the present application and the embodiment of the blockchain-based enterprise authentication method in the present application are based on the same inventive concept. Therefore, for the specific implementation of the embodiment, reference may be made to the implementation of the foregoing corresponding blockchain-based enterprise authentication method, and repeated parts are not described again.

Figure 12:
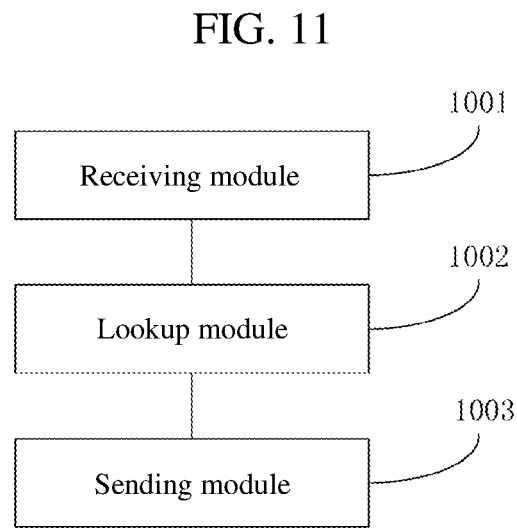
FIG. 12 is a schematic diagram of constituent modules of a blockchain-based enterprise authentication traceability apparatus, according to one or more embodiments of the present specification.

Corresponding to the blockchain-based enterprise authentication traceability method in FIG. 9, based on a same technical concept, one or more embodiments of the present specification further provide a blockchain-based enterprise authentication traceability apparatus. FIG. 12 is a schematic diagram of constituent modules of a blockchain-based enterprise authentication traceability apparatus, according to one or more embodiments of the present specification. The apparatus is configured to perform the blockchain-based enterprise authentication traceability method described in FIG. 9. As shown in FIG. 12, the apparatus includes: a receiving module 1001 configured to receive an enterprise authentication query request sent by a third client, where the enterprise authentication query request includes query credential information; a lookup module 1002 configured to look up a corresponding enterprise authentication record in a blockchain according to the query credential information; and a sending module 1003 configured to send the enterprise authentication record to the third client.

In some embodiments, the lookup module 1002 is In some embodiments configured to: obtain a corresponding block identifier from a correspondence between the stored query credential information and the block identifier according to the query credential information; look up a target block according to the block identifier; and look up, according to the query credential information, a corresponding enterprise authentication record in data stored in the target block.

The blockchain-based enterprise authentication traceability apparatus in one or more embodiments of the present specification can receive the enterprise authentication query request, where the enterprise authentication query request includes query credential information, a corresponding enterprise authentication record is looked up in a blockchain according to the query credential information, and the enterprise authentication record is sent to a client. It may be learned that, according to the embodiments of the present specification, the blockchain-based data cannot be tampered with and traceable, thereby achieving traceability query of enterprise authentication.

Figure 13:
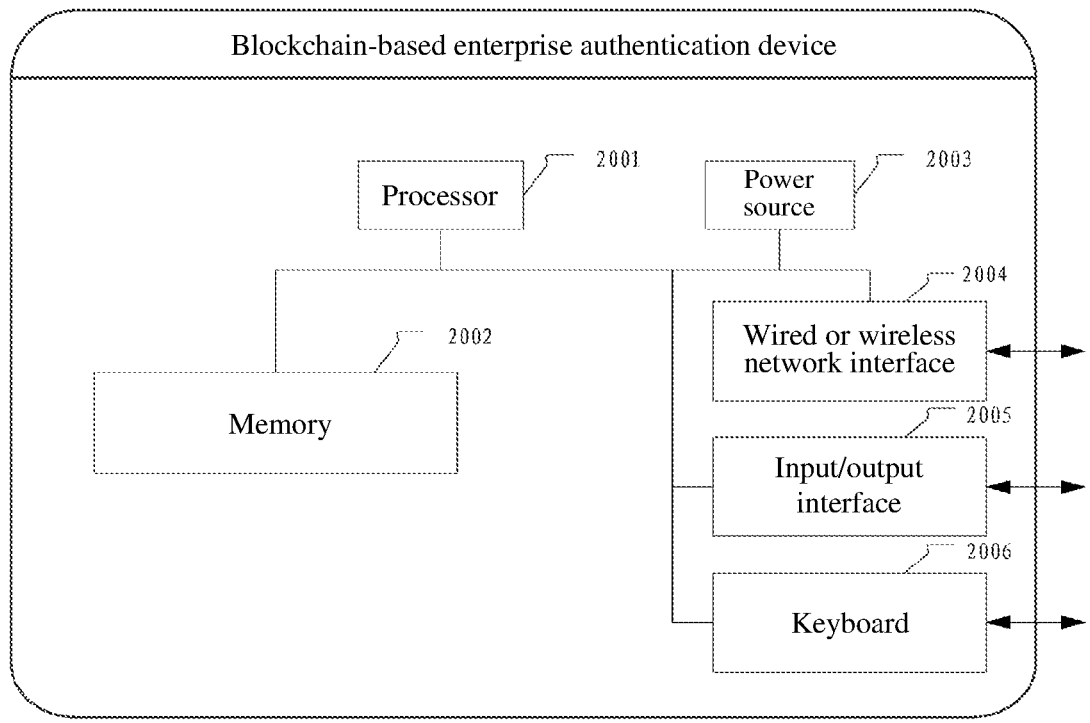
FIG. 13 is a schematic structural diagram of a blockchain-based enterprise authentication device, according to one or more embodiments of the present specification.

Further, corresponding to the methods shown in FIG. 4 to FIG. 8, based on a same technical concept, one or more embodiments of the present specification further provide a blockchain-based enterprise authentication device. The device is configured to perform the foregoing blockchain-based enterprise authentication method, as shown in FIG. 13.

The blockchain-based enterprise authentication device may have relatively large differences due to different configurations or performance, which may include one or more processors 2001 and a memory 2002. The memory 2002 may store one or more storage applications or data. The memory 2002 may provide transitory storage or persistent storage. An application stored in the memory 2002 may include one or more modules (not shown in the figure), each module including a series of computer-executable instructions in a blockchain-based relationship binding device. Further, the processor 2001 may be configured to communicate with the memory 2002 to execute the series of computer-executable instructions in the memory 2002 on the blockchain-based relationship binding device. The blockchain-based relationship binding device may further include one or more power sources 2003, one or more wired or wireless network interfaces 2004, one or more input/output interfaces 2005, one or more keyboards 2006, and the like.

In a specific embodiment, the blockchain-based enterprise authentication device includes a memory and one or more programs. One or more programs are stored in the memory, the one or more programs including one or one modules, and each module may include a series of computer-executable instructions in the blockchain-based relationship binding device. The one or more programs, which are configured for execution by one or more processors, include the following computer-executable instructions for: receiving an enterprise authentication request sent by a client, where the enterprise authentication request includes to-be-authenticated enterprise information, legal representative identity information, and auxiliary authentication information; performing authentication on an identity of an enterprise according to the enterprise information, and performing authentication on an identity of a legal representative of the enterprise according to the legal representative identity information and the auxiliary authentication information; generating an enterprise authentication record if the identity of the enterprise is authenticated and the identity of the legal representative is authenticated; and writing the enterprise authentication record into a blockchain.

In one or more embodiments of the present specification, by adopting a blockchain-based trusted execution environment, an authentication process of the enterprise is transparent and visible to multiple parties, so that credibility and notarization of the authentication process of the enterprise may be guaranteed, and authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

In some embodiments, when the computer-executable instructions are executed, the performing authentication on an identity of an enterprise according to the enterprise information includes: calling a first smart contract deployed in the blockchain, and matching, based on the first smart contract, the to-be-authenticated enterprise information with enterprise information stored in a database of a first designated organization; and if the matching succeeds, determining that the identity of the enterprise is authenticated.

In some embodiments, when the computer-executable instructions are executed, the performing authentication on an identity of a legal representative of the enterprise according to the legal representative identity information and the auxiliary authentication information includes: calling a second smart contract deployed in the blockchain, matching, based on the second smart contract, to-be-authenticated legal representative identity information with the legal representative identity information stored in a database of a second designated organization, and determining whether the legal representative of the enterprise is authenticated through the authentication method corresponding to the auxiliary authentication information; and determining that the identity of the legal representative is authenticated if the matching of the to-be-authenticated legal representative identity information with the legal representative identity information stored in the database of the second designated organization succeeds, and the legal representative is authenticated through the authentication method corresponding to the auxiliary authentication information.

In some embodiments, when the computer-executable instructions are executed, the determining whether the legal representative is authenticated through the authentication method corresponding to the auxiliary authentication information includes: sending an obtaining request of auxiliary legal representative information to the client according to the auxiliary authentication information; obtaining auxiliary legal representative information generated by the client by performing a corresponding operation of the obtaining request; and determining, according to the obtained auxiliary legal representative information, whether the legal representative is authenticated through the authentication method corresponding to the auxiliary authentication information.

In some embodiments, when the computer-executable instructions are executed, the sending an obtaining request of auxiliary legal representative information to the client according to the auxiliary authentication information includes: determining contact information of the legal representative according to the auxiliary authentication information; sending an obtaining request including a first link address to the contact information of the legal representative, so that the client opens an authorization application or a webpage corresponding to the first link address when a trigger operation on the first link address is detected, and collecting a legal representative image through the authorization application or the webpage; the determining, according to the obtained auxiliary legal representative information, whether the legal representative is authenticated through the authentication method corresponding to the auxiliary authentication information includes: matching the obtained legal representative image with the legal representative image stored in the database of the second designated organization; and determining that the legal representative is authenticated through the authentication method corresponding to the auxiliary authentication information if the matching succeeds.

In some embodiments, when the computer-executable instructions are executed, the sending an obtaining request of auxiliary legal representative information to the client according to the auxiliary authentication information includes: determining contact information of the legal representative according to the auxiliary authentication information; sending an obtaining request including a second link address to the contact information of the legal representative, so that the client opens an authorization application or a webpage corresponding to the second link address when a trigger operation on the second link address is detected, and performing an account operation through the authorization application or the webpage; the determining, according to the obtained auxiliary legal representative information, whether the legal representative is authenticated through the authentication method corresponding to the auxiliary authentication information includes: determining whether the obtained operation record corresponding to the account operation meets a preset condition; and if so, determining that the legal representative is authenticated through the authentication method corresponding to the auxiliary authentication information.

In some embodiments, when the computer-executable instructions are executed, the receiving an enterprise authentication request sent by a client includes: receiving an enterprise authentication request sent by a first client, where the first client is operated by a legal representative of the enterprise; and the sending an obtaining request of auxiliary legal representative information to the client includes: sending the obtaining request of the auxiliary legal representative information to the first client.

In some embodiments, when the computer-executable instructions are executed, the receiving an enterprise authentication request sent by a client includes: receiving an enterprise authentication request sent by a second client, where the second client is operated by an agent, and the agent does not include the legal representative; and the sending an obtaining request of auxiliary legal representative information to the client includes: sending the obtaining request of the auxiliary legal representative information to the first client, where the first client is operated by the legal representative.

In some embodiments, when the computer-executable instructions are executed, the method further includes: receiving agent identity information and an agent image that are sent by the second client; and performing authentication on an identity of the agent according to the agent identity information and the agent image.

In some embodiments, when the computer-executable instructions are executed, after the generating an enterprise authentication record, the method further includes: determining query credential information of the enterprise authentication record; and sending the query credential information to the client, so that the client queries the enterprise authentication record according to the query credential information.

In some embodiments, when the computer-executable instructions are executed, the writing the enterprise authentication record into a blockchain includes: correspondingly writing the enterprise authentication record and the query credential information into the blockchain.

The blockchain-based enterprise authentication device provided in one or more embodiments of the present specification can receive an enterprise authentication request sent by a client, where the enterprise authentication request includes to-be-authenticated enterprise information, legal representative identity information, and auxiliary authentication information. Authentication is performed on an identity of an enterprise according to the enterprise information, and authentication is performed on an identity of a legal representative of the enterprise according to the legal representative identity information and the auxiliary authentication information. If the identity of the enterprise is authenticated and the identity of the legal representative is authenticated, an enterprise authentication record is generated, and the enterprise authentication record is written into a blockchain. It may be learned that, according to the embodiment of the present specification, by adopting a blockchain-based trusted execution environment, an authentication process of the enterprise is transparent and visible to multiple parties, so that credibility and notarization of the authentication process of the enterprise may be guaranteed, and authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

It may be noted that the embodiment of the blockchain-based enterprise authentication device in the present application and the embodiment of the blockchain-based enterprise authentication method in the present application are based on the same inventive concept. Therefore, for the specific implementation of the embodiment, reference may be made to the implementation of the foregoing corresponding blockchain-based enterprise authentication method, and repeated parts are not described again.

Figure 14:
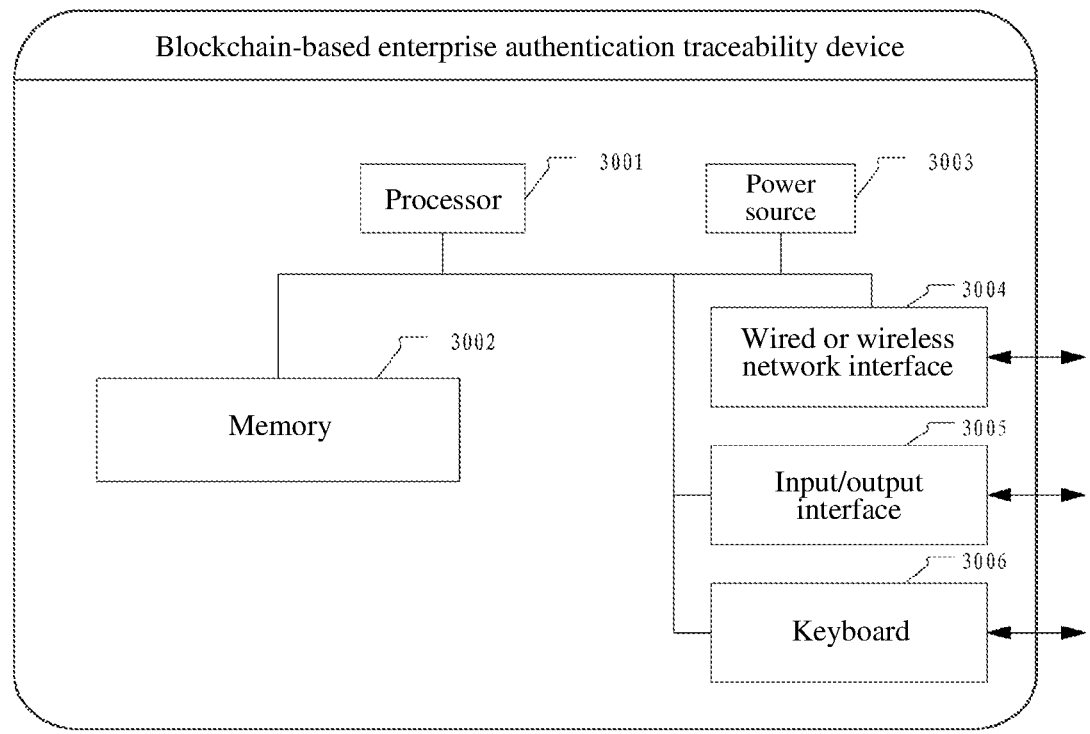
FIG. 14 is a schematic structural diagram of a blockchain-based enterprise authentication traceability device, according to one or more embodiments of the present specification.

Further, corresponding to the method shown in FIG. 10, based on a same technical concept, one or more embodiments of the present specification further provide a blockchain-based enterprise authentication traceability device. The device is configured to perform the foregoing blockchain-based enterprise authentication traceability method, as shown in FIG. 14.

The blockchain-based enterprise authentication traceability device may have relatively large differences due to different configurations or performance, which may include one or more processors 3001 and a memory 3002. The memory 3002 may store one or more storage applications or data. The memory 3002 may provide transitory storage or persistent storage. An application stored in the memory 3002 may include one or more modules (not shown in the figure), each module including a series of computer-executable instructions in a blockchain-based relationship binding device. Further, the processor 3001 may be configured to communicate with the memory 3002 to execute the series of computer-executable instructions in the memory 3002 on the blockchain-based relationship binding device. The blockchain-based relationship binding device may further include one or more power sources 3003, one or more wired or wireless network interfaces 3004, one or more input/output interfaces 3005, one or more keyboards 3006, and the like.

In a specific embodiment, the blockchain-based enterprise authentication device includes a memory and one or more programs. One or more programs are stored in the memory, the one or more programs including one or one modules, and each module may include a series of computer-executable instructions in the blockchain-based relationship binding device. The one or more programs, which are configured for execution by one or more processors, include the following computer-executable instructions for: receiving an enterprise authentication query request sent by a third client, where the enterprise authentication query request includes query credential information; looking up a corresponding enterprise authentication record in a blockchain according to the query credential information; and sending the enterprise authentication record to the third client.

In some embodiments, when the computer-executable instructions are executed, the looking up a corresponding authentication record in a blockchain according to the query credential information includes: obtaining a corresponding block identifier from a correspondence between the stored query credential information and the block identifier according to the query credential information; looking up a target block according to the block identifier; and looking up, according to the query credential information, a corresponding enterprise authentication record in data stored in the target block.

The blockchain-based enterprise authentication traceability device in one or more embodiments of the present specification can receive an enterprise authentication query request sent by the third client, where the enterprise authentication query request includes query credential information, a corresponding enterprise authentication record is looked up in a blockchain according to the query credential information, and the enterprise authentication record is sent to the third client. It may be learned that, according to the embodiments of the present specification, the blockchain-based data cannot be tampered with and traceable, thereby achieving traceability query of enterprise authentication.

It may be noted that the embodiment of the blockchain-based enterprise authentication traceability device in the present application and the embodiment of the blockchain-based enterprise authentication traceability method in the present application are based on the same inventive concept. Therefore, for the specific implementation of the embodiment, reference may be made to the implementation of the foregoing corresponding blockchain-based enterprise authentication traceability method, and repeated parts are not described again.

Further, corresponding to the methods shown in FIG. 4 to FIG. 8, based on the same technical concept, one or more embodiments of the present specification further provide a storage medium for storing computer-executable instructions. In a specific embodiment, the storage medium may be a U disk, an optical disk, a hard disk, etc. When the computer-executable instructions stored in the storage medium are executed by a processor, the following processes can be implemented: receiving an enterprise authentication request sent by a client, where the enterprise authentication request includes to-be-authenticated enterprise information, legal representative identity information, and auxiliary authentication information; performing authentication on an identity of an enterprise according to the enterprise information, and performing authentication on an identity of a legal representative of the enterprise according to the legal representative identity information and the auxiliary authentication information; generating an enterprise authentication record if the identity of the enterprise is authenticated and the identity of the legal representative is authenticated; and writing the enterprise authentication record into a blockchain.

In one or more embodiments of the present specification, by adopting a blockchain-based trusted execution environment, an authentication process of the enterprise is transparent and visible to multiple parties, so that credibility and notarization of the authentication process of the enterprise may be guaranteed, and authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

In some embodiments, when the computer-executable instructions stored in the storage medium are executed by the processor, the performing authentication on an identity of an enterprise according to the enterprise information includes: calling a first smart contract deployed in the blockchain, and matching, based on the first smart contract, the to-be-authenticated enterprise information with enterprise information stored in a database of a first designated organization; and if the matching succeeds, determining that the identity of the enterprise is authenticated.

In some embodiments, when the computer-executable instructions stored in the storage medium are executed by the processor, the performing authentication on an identity of a legal representative of the enterprise according to the legal representative identity information and the auxiliary authentication information includes: calling a second smart contract deployed in the blockchain, matching, based on the second smart contract, to-be-authenticated legal representative identity information with the legal representative identity information stored in a database of a second designated organization, and determining whether the legal representative of the enterprise is authenticated through an authentication method corresponding to the auxiliary authentication information; and determining that the identity of the legal representative is authenticated if the matching of the to-be-authenticated legal representative identity information with the legal representative identity information stored in the database of the second designated organization succeeds, and the legal representative is authenticated through the authentication method corresponding to the auxiliary authentication information.

In some embodiments, when the computer-executable instructions stored in the storage medium are executed by the processor, the enterprise authentication record includes timestamp information of the authenticated identity of the enterprise and/or timestamp information of the authenticated identity of the legal representative.

In some embodiments, when the computer-executable instructions stored in the storage medium are executed by the processor, the determining whether the legal representative is authenticated through the authentication method corresponding to the auxiliary authentication information includes: sending an obtaining request of auxiliary legal representative information to the client according to the auxiliary authentication information; obtaining auxiliary legal representative information generated by the client by performing a corresponding operation of the obtaining request; and determining, according to the obtained auxiliary legal representative information, whether the legal representative is authenticated through the authentication method corresponding to the auxiliary authentication information.

In some embodiments, when the computer-executable instructions stored in the storage medium are executed by the processor, the sending an obtaining request of auxiliary legal representative information to the client according to the auxiliary authentication information includes: determining contact information of the legal representative according to the auxiliary authentication information; sending an obtaining request including a first link address to the contact information of the legal representative, so that the client opens an authorization application or a webpage corresponding to the first link address when a trigger operation on the first link address is detected, and collecting a legal representative image through the authorization application or the webpage; the determining, according to the obtained auxiliary legal representative information, whether the legal representative is authenticated through the authentication method corresponding to the auxiliary authentication information includes: matching the obtained legal representative image with the legal representative image stored in the database of the second designated organization; and determining that the legal representative is authenticated through the authentication method corresponding to the auxiliary authentication information if the matching succeeds.

In some embodiments, when the computer-executable instructions stored in the storage medium are executed by the processor, the sending an obtaining request of auxiliary legal representative information to the client according to the auxiliary authentication information includes: determining contact information of the legal representative according to the auxiliary authentication information; sending an obtaining request including a second link address to the contact information of the legal representative, so that the client opens an authorization application or a webpage corresponding to the second link address when a trigger operation on the second link address is detected, and performing an account operation through the authorization application or the webpage; the determining, according to the obtained auxiliary legal representative information, whether the legal representative is authenticated through the authentication method corresponding to the auxiliary authentication information includes: determining whether the obtained operation record corresponding to the account operation meets a preset condition; and if so, determining that the legal representative is authenticated through the authentication method corresponding to the auxiliary authentication information.

In some embodiments, when the computer-executable instructions stored in the storage medium are executed by the processor, the receiving an enterprise authentication request sent by a client includes: receiving an enterprise authentication request sent by a first client, where the first client is operated by a legal representative of the enterprise; and the sending an obtaining request of auxiliary legal representative information to the client includes: sending the obtaining request of the auxiliary legal representative information to the first client.

In some embodiments, when the computer-executable instructions stored in the storage medium are executed by the processor, the receiving an enterprise authentication request sent by a client includes: receiving an enterprise authentication request sent by a second client, where the second client is operated by an agent, and the agent does not include the legal representative; and the sending an obtaining request of auxiliary legal representative information to the client includes: sending the obtaining request of the auxiliary legal representative information to the first client, where the first client is operated by the legal representative.

In some embodiments, when the computer-executable instructions stored in the storage medium are executed by the processor, the method further includes: receiving agent identity information and an agent image that are sent by the second client; and performing authentication on an identity of the agent according to the agent identity information and the agent image.

In some embodiments, when the computer-executable instructions stored in the storage medium are executed by the processor, after the generating an enterprise authentication record, the method further includes: determining query credential information of the enterprise authentication record; and sending the query credential information to the client, so that the client queries the enterprise authentication record according to the query credential information.

In some embodiments, when the computer-executable instructions stored in the storage medium are executed by the processor, the writing the enterprise authentication record into a blockchain includes: correspondingly writing the enterprise authentication record and the query credential information into the blockchain.

When the computer-executable instructions stored in the storage medium provided in one or more embodiments of the present specification are executed by the processor, an enterprise authentication request sent by a client is received, where the enterprise authentication request includes to-be-authenticated enterprise information, legal representative identity information, and auxiliary authentication information. Authentication is performed on an identity of an enterprise according to the enterprise information, and authentication is performed on an identity of a legal representative of the enterprise according to the legal representative identity information and the auxiliary authentication information. If the identity of the enterprise is authenticated and the identity of the legal representative is authenticated, an enterprise authentication record is generated, and the enterprise authentication record is written into a blockchain. It may be learned that, according to the embodiment of the present specification, by adopting a blockchain-based trusted execution environment, an authentication process of the enterprise is transparent and visible to multiple parties, so that credibility and notarization of the authentication process of the enterprise may be guaranteed, and authentication results are brought on chain to ensure tamper resistance and judicial validity of the authentication results as well as traceability of the authentication process of the enterprise. Furthermore, the authentication process does not require a lot of manpower and time, which improves authentication efficiency and reduces authentication costs.

It may be noted that the embodiment of the storage medium in the present application and the embodiment of the blockchain-based enterprise authentication method in the present application are based on the same inventive concept. Therefore, for the specific implementation of the embodiment, reference may be made to the implementation of the foregoing corresponding blockchain-based enterprise authentication method, and repeated parts are not described again.

Further, corresponding to the method shown in FIG. 10, based on the same technical concept, one or more embodiments of the present specification further provide a storage medium for storing computer-executable instructions. In a specific embodiment, the storage medium may be a U disk, an optical disk, a hard disk, etc. When the computer-executable instructions stored in the storage medium are executed by a processor, the following processes can be implemented: receiving an enterprise authentication query request sent by a third client, where the enterprise authentication query request includes query credential information; looking up a corresponding enterprise authentication record in a blockchain according to the query credential information; and sending the enterprise authentication record to the third client.

In some embodiments, when the computer-executable instructions stored in the storage medium are executed by the processor, the looking up a corresponding authentication record in a blockchain according to the query credential information includes: obtaining a corresponding block identifier from a correspondence between the stored query credential information and the block identifier according to the query credential information; looking up a target block according to the block identifier; and looking up, according to the query credential information, a corresponding enterprise authentication record in data stored in the target block.

When the computer-executable instructions stored in the storage medium provided in one or more embodiments of the present specification are executed by the processor, an enterprise authentication query request sent by the third client is received, where the enterprise authentication query request includes query credential information, a corresponding enterprise authentication record is looked up in the blockchain according to the query credential information, and the enterprise authentication record is sent to the third client. It may be learned that, according to the embodiments of the present specification, the blockchain-based data cannot be tampered with and traceable, thereby achieving traceability query of enterprise authentication.

It may be noted that the embodiment about the storage medium in the present application and the embodiment about the blockchain-based enterprise authentication traceability method in the present specification are based on the same inventive concept. Therefore, for the specific implementation of the embodiment, reference may be made to the implementation of the foregoing corresponding blockchain-based enterprise authentication traceability method, and repeated parts are not described again.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler software, which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art may also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be In some embodiments implemented by a computer chip or an entity or implemented by a product having a certain function. A typical implementation device is a computer. In some embodiments, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of this application, the function of the units may be implemented in a same piece of or multiple pieces of software and/or hardware.

A person skilled in the art may understand that the embodiments of this application may be provided as a method, a system, or a computer program product. Therefore, this application may use a form of a hardware-only embodiment, a software-only embodiment, or an embodiment combining software and hardware. In addition, this application may use a form of a computer program product implemented on one or more computer available storage media (including but not limited to a disk memory, a CD-ROM, an optical memory, and the like) including computer available program code.

This application is described with reference to flowcharts and/or block diagrams of the method, the device (system), and the computer program product in the embodiments of this application. It may be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include, among computer readable media, a non-persistent memory such as a random-access memory (RAM) and/or a non-volatile memory such as a read-only memory (ROM) or a flash memory (flash RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It may also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art may understand that the embodiments of this application may be provided as a method, a system, or a computer program product. Therefore, this application may use a form of hardware only embodiments, software only embodiments, or embodiments with a combination of software and hardware. In addition, this application may use a form of a computer program product implemented on one or more computer available storage media (including but not limited to a disk memory, a CD-ROM, an optical memory, and the like) including computer available program code.

This application can be described in the general context of computer executable instructions executed by a computer, for example, a program module. Generally, the program module includes a routine, a program, an object, a component, a data structure, and the like for executing a particular task or implementing a particular abstract data type. This application can also be practiced in a distributed computing environment in which tasks are performed by remote processing devices that are connected through a communication network. In a distributed computing environment, the program module may be located in both local and remote computer storage media including storage devices.

The embodiments in this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of this application and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A blockchain-based enterprise authentication method, comprising:
    receiving an enterprise authentication request, wherein the enterprise authentication request comprises to-be-authenticated enterprise information of an enterprise, to-be-authenticated identity information of a legal representative of the enterprise, and auxiliary authentication information;
    performing, through a first smart contract deployed in a blockchain, a first determination of whether the to-be-authenticated enterprise information matches with enterprise information stored in a first database;
    performing, through a second smart contract deployed in the blockchain, a second determination of whether the to-be-authenticated identity information matches with legal representative identity information stored in a second database;
    sending an obtaining request to a client device for auxiliary legal representative information according to the auxiliary authentication information;
    performing, through the second smart contract deployed in the blockchain, a third determination of whether the to-be-authenticated identity information is authenticated based on the auxiliary legal representative information;
    generating an enterprise authentication record when the first determination, the second determination, and the third determination are affirmative;
    writing the enterprise authentication record into the blockchain;
    wherein the sending an obtaining request to a client device for auxiliary legal representative information comprises:
        determining contact information of the legal representative according to the auxiliary authentication information; and
        sending an obtaining request comprising a first hyperlink address based on the contact information, wherein a trigger operation on the first hyperlink address opens an authorization application or a webpage by which a legal representative image is collected; and
    the performing a third determination of whether the to-be-authenticated identity information is authenticated based on the auxiliary legal representative information comprises:
        determining whether the collected legal representative image matches with a legal representative image stored in the second database; and
        if so, determining that the to-be-authenticated identity information is authenticated based on the auxiliary authentication information.

2. The method according to claim 1, wherein the enterprise authentication record comprises at least one of the following:
    timestamp information of the first determination; and
    timestamp information of the second determination.

3. The method according to claim 1, wherein the sending an obtaining request to a client device for auxiliary legal representative information comprises:
    sending an obtaining request comprising a second hyperlink address based on the contact information, wherein a trigger operation on the second hyperlink address opens an authorization application or a webpage by which an account operation is obtained; and
    the determining a third determination of whether the to-be-authenticated identity information is authenticated based on the auxiliary legal representative information comprises:
    determining whether an obtained account operation meets a preset condition; and
    if so, determining that the legal representative is authenticated based on the auxiliary authentication information.

4. The method according to claim 1, wherein the receiving an enterprise authentication request comprises:
    receiving an enterprise authentication request sent by a first client device that is operated by the legal representative; and
    wherein the sending an obtaining request to a client device comprises:
    sending an obtaining request to the first client device.

5. The method according to claim 1, wherein the receiving an enterprise authentication request comprises:
    receiving an enterprise authentication request from a second client device, wherein the second client device is operated by an agent that is different from the legal representative of the enterprise; and
    wherein the sending an obtaining request to a client device comprises:
    sending an obtaining request to the second client device.

6. The method according to claim 5, further comprising:
    receiving agent identity information and an agent image that are sent by the second client device; and
    performing authentication on the agent according to the agent identity information and the agent image.

7. The method according to claim 1, wherein after the generating an enterprise authentication record, the method further comprises:

generating unique query credential information of the enterprise authentication record; and sending the unique query credential information to the client device for future queries of the enterprise authentication record.

8. The method according to claim 7, wherein the writing the enterprise authentication record into the blockchain comprises:

writing the enterprise authentication record and the query credential information into the blockchain; and creating a correspondence between the enterprise authentication record and the query credential information into the blockchain.

9. The method according to claim 1, wherein the first database and the second database are stored in the blockchain, and are accessible by the first smart contract and the second smart contract.

10. A system for blockchain-based enterprise authentication, comprising one or more processors and one or more non-transitory computer-readable memories coupled to the one or more processors and configured with instructions executable by the one or more processors to cause the system to perform operations comprising:

receiving an enterprise authentication request, wherein the enterprise authentication request comprises to-be-authenticated enterprise information of an enterprise, to-be-authenticated identity information of a legal representative of the enterprise, and auxiliary authentication information;

performing, through a first smart contract deployed in a blockchain, a first determination of whether the to-be-authenticated enterprise information matches with enterprise information stored in a first database;

performing, through a second smart contract deployed in the blockchain, a second determination of whether the to-be-authenticated identity information matches with legal representative identity information stored in a second database;

sending an obtaining request to a client device for auxiliary legal representative information according to the auxiliary authentication information;

performing, through the second smart contract deployed in the blockchain, a third determination of whether the to-be-authenticated identity information is authenticated based on the auxiliary legal representative information;

generating an enterprise authentication record when the first determination, the second determination, and the third determination are affirmative;

writing the enterprise authentication record into the blockchain;

wherein the sending an obtaining request to a client device for auxiliary legal representative information comprises:

determining contact information of the legal representative according to the auxiliary authentication information; and sending an obtaining request comprising a first hyperlink address based on the contact information, wherein a trigger operation on the first hyperlink address opens an authorization application or a webpage by which a legal representative image is collected; and the performing a third determination of whether the to-be-authenticated identity information is authenticated based on the auxiliary legal representative information comprises:

determining whether the collected legal representative image matches with a legal representative image stored in the second database; and if so, determining that the to-be-authenticated identity information is authenticated based on the auxiliary authentication information.

11. The system according to claim 10, wherein the enterprise authentication record comprises at least one of the following:

timestamp information of the first determination and;

timestamp information of the second determination.

12. The system according to claim 10, wherein the sending an obtaining request to a client device for auxiliary legal representative information comprises:

sending an obtaining request comprising a second hyperlink address based on the contact information, wherein a trigger operation on the second hyperlink address opens an authorization application or a webpage by which an account operation is obtained; and the determining a third determination of whether the to-be-authenticated identity information is authenticated based on the auxiliary legal representative information comprises:

determining whether an obtained account operation meets a preset condition; and if so, determining that the legal representative is authenticated based on the auxiliary authentication information.

13. The system according to claim 10, wherein the receiving an enterprise authentication request comprises:

receiving an enterprise authentication request from a second client device, wherein the second client device is operated by an agent that is different from the legal representative of the enterprise; and wherein the sending an obtaining request to a client device comprises:

sending an obtaining request to the second client device.

14. A non-transitory computer-readable storage medium for blockchain-based enterprise authentication, configured with instructions executable by one or more processors to cause the one or more processors to perform operations comprising:

receiving an enterprise authentication request, wherein the enterprise authentication request comprises to-be-authenticated enterprise information of an enterprise, to-be-authenticated identity information of a legal representative of the enterprise, and auxiliary authentication information;

performing, through a first smart contract deployed in a blockchain, a first determination of whether the to-be-authenticated enterprise information matches with enterprise information stored in a first database;

performing, through a second smart contract deployed in the blockchain, a second determination of whether the to-be-authenticated identity information matches with legal representative identity information stored in a second database;

sending an obtaining request to a client device for auxiliary legal representative information according to the auxiliary authentication information;

performing, through the second smart contract deployed in the blockchain, a third determination of whether the to-be-authenticated identity information is authenticated based on the auxiliary legal representative information;

generating an enterprise authentication record when the first determination, the second determination, and the third determination are affirmative;
writing the enterprise authentication record into the blockchain;
wherein the sending an obtaining request to a client device for auxiliary legal representative information comprises:
determining contact information of the legal representative according to the auxiliary authentication information; and
sending an obtaining request comprising a first hyperlink address based on the contact information, wherein a trigger operation on the first hyperlink address opens an authorization application or a webpage by which a legal representative image is collected; and
the performing a third determination of whether the to-be-authenticated identity information is authenticated based on the auxiliary legal representative information comprises:
determining whether the collected legal representative image matches with a legal representative image stored in the second database; and
if so, determining that the to-be-authenticated identity information is authenticated based on the auxiliary authentication information.

15. The storage medium according to claim 14, wherein the enterprise authentication record comprises at least one of the following:
timestamp information of the first determination and;
timestamp information of the second determination.

16. The storage medium according to claim 14, wherein the sending an obtaining request to a client device for auxiliary legal representative information comprises:
sending an obtaining request comprising a second hyperlink address based on the contact information, wherein a trigger operation on the second hyperlink address opens an authorization application or a webpage by which an account operation is obtained; and
the determining a third determination of whether the to-be-authenticated identity information is authenticated based on the auxiliary legal representative information comprises:
determining whether an obtained account operation meets a preset condition; and
if so, determining that the legal representative is authenticated based on the auxiliary authentication information.

17. The storage medium according to claim 14, wherein the receiving an enterprise authentication request comprises:
receiving an enterprise authentication request from a second client device, wherein the second client device is operated by an agent that is different from the legal representative of the enterprise; and
wherein the sending an obtaining request to a client device comprises:
sending an obtaining request to the second client device.

* * * * *